(12) United States Patent
Hyun et al.

(10) Patent No.: US 11,232,456 B2
(45) Date of Patent: Jan. 25, 2022

(54) ELECTRONIC DEVICE FOR CONTROLLING ELECTRONIC PAYMENT AND METHOD THEREFOR

(71) Applicant: Samsung Electronics Co., Ltd., Gyeonggi-do (KR)

(72) Inventors: Junho Hyun, Gyeonggi-do (KR); Dongho Jang, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/766,920

(22) PCT Filed: Nov. 28, 2018

(86) PCT No.: PCT/KR2018/014803
§ 371 (c)(1),
(2) Date: May 26, 2020

(87) PCT Pub. No.: WO2019/107907
PCT Pub. Date: Jun. 6, 2019

(65) Prior Publication Data
US 2021/0019748 A1 Jan. 21, 2021

(30) Foreign Application Priority Data

Nov. 30, 2017 (KR) .......................... 10-2017-0163177

(51) Int. Cl.
*G06Q 20/40* (2012.01)
*G06Q 20/32* (2012.01)
(Continued)

(52) U.S. Cl.
CPC ......... *G06Q 20/407* (2013.01); *G06Q 20/047* (2020.05); *G06Q 20/209* (2013.01);
(Continued)

(58) Field of Classification Search
None
See application file for complete search history.

(56) References Cited

U.S. PATENT DOCUMENTS

| 9,715,689 | B1 * | 7/2017 | Ellis | ..................... G06Q 20/322 |
| 10,019,705 | B2 * | 7/2018 | Seol | ..................... G06F 3/04883 |

(Continued)

FOREIGN PATENT DOCUMENTS

| JP | 2017-62816 A | 3/2017 |
| KR | 10-1447910 B1 | 10/2014 |

(Continued)

*Primary Examiner* — Jamie R Kucab
(74) *Attorney, Agent, or Firm* — Cha & Reiter, LLC

(57) ABSTRACT

Various embodiments of the present invention relate to an electronic device and method for controlling electronic payment. To this end, the electronic device according to various embodiments of the present invention may comprise: a housing; a first wireless communication circuit; a second wireless communication circuit, a touchscreen display exposed on one side of the housing; a processor disposed within the housing and operatively connected to the first wireless communication circuit, the second wireless communication circuit, and the touchscreen display; and a memory disposed within the housing and operatively connected to the processor, wherein the memory stores an application program configured to make payment by using the first wireless communication circuit, and the memory stores instructions which, when executed, cause the process to: perform a transaction with an external payment device through the first wireless communication circuit by using the application program; receive a transaction result including receipt information from an external server through the second wireless communication circuit by using the application program; after the transaction result is received, transmit a request for refund to the external payment device through the first communication circuit on the basis of the (Continued)

received transaction result, the request for refund including at least one of a transaction store, a transaction date, an approval code, a transaction item, a transaction quantity, and a transaction identifier (ID); and receive information on the refund from the external server through the second wireless communication circuit by using the application program. Other embodiments are also possible.

13 Claims, 13 Drawing Sheets

(51) Int. Cl.
- *G06Q 20/04* (2012.01)
- *G06Q 20/20* (2012.01)
- *G06Q 20/38* (2012.01)
- *H04L 9/30* (2006.01)

(52) U.S. Cl.
CPC ....... *G06Q 20/326* (2020.05); *G06Q 20/3274* (2013.01); *G06Q 20/3276* (2013.01); *G06Q 20/3278* (2013.01); *G06Q 20/3829* (2013.01); *H04L 9/30* (2013.01); *G06Q 2220/00* (2013.01); *H04L 2209/56* (2013.01)

(56) References Cited

U.S. PATENT DOCUMENTS

| | | | |
|---|---|---|---|
| 10,325,261 B2* | 6/2019 | Dimmick | G06Q 20/4014 |
| 10,475,006 B2* | 11/2019 | Kieffer | G06Q 20/389 |
| 2013/0132188 A1* | 5/2013 | Quinlan | G06Q 30/0222 705/14.34 |
| 2014/0249997 A1* | 9/2014 | Susaki | G06Q 20/3278 705/39 |
| 2016/0063499 A1* | 3/2016 | Sugiyama | G07G 5/00 705/23 |
| 2016/0104155 A1* | 4/2016 | Mcgaugh | G06Q 20/401 705/65 |
| 2016/0180325 A1* | 6/2016 | Davis | G06Q 20/325 705/44 |
| 2016/0379187 A1* | 12/2016 | Wijngaarden | G06Q 20/047 705/40 |
| 2017/0004484 A1* | 1/2017 | Seol | G06Q 20/356 |
| 2017/0024736 A1* | 1/2017 | Cho | G06Q 20/407 |
| 2017/0221022 A1* | 8/2017 | Goloshchuk | G06Q 20/0855 |
| 2018/0101828 A1* | 4/2018 | Kieffer | G06Q 20/351 |
| 2018/0365680 A1* | 12/2018 | Davis | G06Q 20/3224 |
| 2019/0251569 A1* | 8/2019 | Dimmick | G06Q 20/407 |
| 2020/0097968 A1* | 3/2020 | Sukhija | G06Q 20/108 |
| 2020/0286091 A1* | 9/2020 | Ji | G06Q 20/407 |

FOREIGN PATENT DOCUMENTS

| | | |
|---|---|---|
| KR | 10-2016-0143186 A | 12/2016 |
| KR | 10-2017-0004258 A | 1/2017 |
| KR | 10-2017-0011920 A | 2/2017 |
| KR | 10-2017-0018556 A | 2/2017 |
| KR | 10-1702036 B1 | 2/2017 |
| KR | 10-2017-0045610 A | 4/2017 |
| KR | 10-2017-0085728 A | 7/2017 |

* cited by examiner

ELECTRONIC DEVICE FOR CONTROLLING ELECTRONIC PAYMENT AND METHOD THEREFOR

CROSS-REFERENCE TO RELATED APPLICATION(S)

This application is a National Phase Entry of PCT International Application No. PCT/KR2018/014803, which was filed on Nov. 28, 2018 and claims priority to Korean Patent Application No. 10-2017-0163177, which was filed on Nov. 30, 2017, the contents of which are incorporated herein by reference.

BACKGROUND

1. Field

The disclosure relates to an electronic device for controlling electronic payment and method therefor.

2. Description of the Related Art

Recently, various services and additional functions provided by electronic devices have been gradually expanded. In order to increase the utility value of these electronic devices and satisfy various needs of users, communication service providers or electronic device manufacturers provide more various functions and competitively develop various services for differentiation from other companies.

Also, the electronic device may store payment means (e.g., card information) for providing a payment service, and a user may make a payment based on the stored card information. For example, in a case in which a user wants to proceed with payment using an electronic device, when a card stored in the electronic device is selected, the electronic device may make a payment based on the selected card.

SUMMARY

In order to prove a refund or payment details after payment using the electronic device is completed, the user has the inconvenience of needing to receive, store, or submit a paper receipt.

In addition, in the process of receiving a refund of the paid amount, if the issued paper receipt is lost, the refund can be cumbersome.

In addition, if a user wants to share the paid amount with other people, it is not easy to share the payment details with other people besides providing the issued paper receipt.

According to various embodiments of the disclosure, after payment using an electronic device is completed, payment details may be transmitted to a payment device based on wireless communication to request a refund, or may be provided to another user.

An electronic device according to various embodiments may include: a housing; a first wireless communication circuit; a second wireless communication circuit; a touchscreen display configured to be exposed through one side of the housing; a processor configured to be disposed in the housing and to be operatively connected to the first wireless communication circuit, the second wireless communication circuit, and the touchscreen display; and a memory configured to be disposed in the housing and to be operatively connected to the processor, wherein the memory stores an application program configured to make a payment by using the first wireless communication circuit, and stores instructions which, when executed, cause the processor to: perform a transaction with an external payment device through the first wireless communication circuit by using the application program; receive a transaction result including receipt information from an external server through the second wireless communication circuit by using the application program; after the transaction result is received, transmit a request for a refund to the external payment device through the first communication circuit by using the application program on the basis of the received transaction result, the request for the refund including at least one of a transaction store, a transaction date, an approval number, a transaction item, a transaction quantity, and a transaction identifier (ID); and receive information on the refund from the external server through the second wireless communication circuit by using the application program.

An electronic device according to various embodiments may include: a housing; a first wireless communication circuit; a second wireless communication circuit; a touchscreen display configured to be exposed through one side of the housing; a processor configured to be disposed in the housing and to be operatively connected to the first wireless communication circuit (near-distance wireless communication circuit), the second wireless communication circuit (cellular wireless communication circuit), and the touchscreen display; and a memory configured to be disposed in the housing and to be operatively connected to the processor, wherein the memory stores an application program configured to make a payment by using the first wireless communication circuit, and stores instructions which, when executed, cause the processor to: perform a transaction with an external payment device through the first wireless communication circuit by using the application program; receive a transaction result including receipt information from an external server through the second wireless communication circuit by using the application program; display the receipt information and a user interface including a user selection for sharing or transmission of the receipt information; encrypt the receipt information on the basis of the selection; and transmit the encrypted receipt information through the second wireless communication circuit.

A computer-readable storage medium that stores a program including instructions for performing payment in an electronic device, may include: a first instruction set configured to perform a transaction with an external payment device through a first wireless communication circuit by using an application program; a second instruction set configured to receive a transaction result including receipt information from an external server through a second wireless communication circuit by using the application program; a third instruction set configured to transmit, after a transaction result is received, a request for a refund to the external payment device through the first communication circuit by using the application program on the basis of the received transaction result, the request for the refund including at least one of a transaction store, a transaction date, an approval number, a transaction item, a transaction quantity, and a transaction ID; and a fourth instruction set configured to receive information on the refund from the external server through the second wireless communication circuit by using the application program.

According to various embodiments, after payment using an electronic device is completed, a refund can be easily processed by transmitting payment details to a payment device using a file or a universal resource locator (URL).

Also, according to various embodiments, user convenience can be improved by performing authentication required for a refund based on payment details.

Also, according to various embodiments, inconvenience of having to carry a paper receipt according to payment may be eliminated by transmitting payment details to another electronic device.

DETAILED DESCRIPTION

Figure 1:
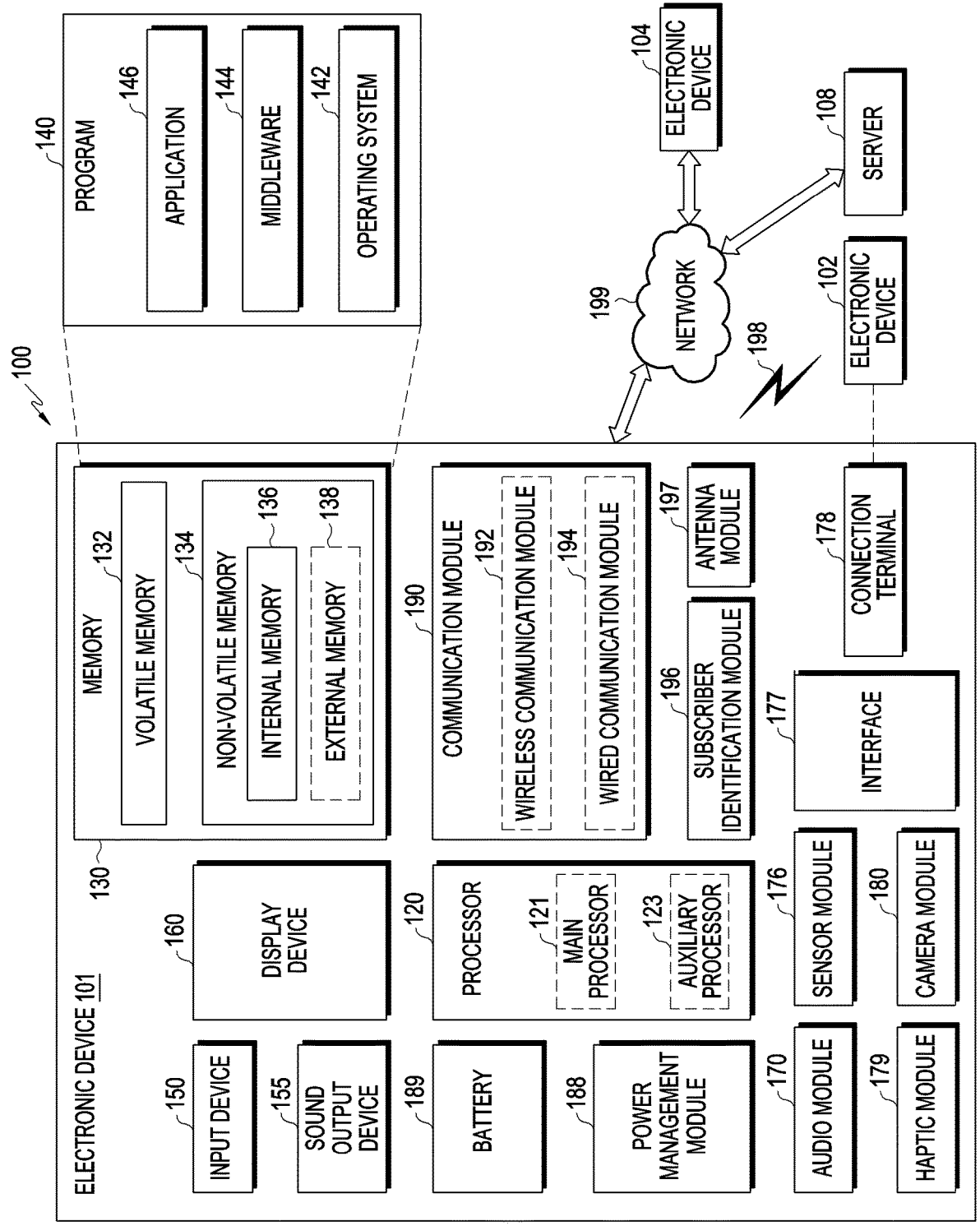
FIG. 1 is a block diagram illustrating an electronic device 101 in a network environment 100 according to various embodiments.

FIG. 1 is a block diagram illustrating an electronic device 101 in a network environment 100 according to various embodiments.

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components be integrated and implemented as in, for example, the sensor module 176 (e.g., a fingerprint sensor, an iris sensor, or an illuminance sensor) embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing and computation. The processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from the main processor 121. Additionally or alternatively, the auxiliary processor 123 may be adapted to consume less power than the main processor 121, or to be specific to a specified function. Here, the auxiliary processor 123 may be operated separately from or embedded in the main processor 121.

In such a case, the auxiliary processor 123 may control, for example, at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active (e.g., executing an application) state. According to an embodiment, the auxiliary processor 123 (e.g., an image signal processor or a communication processor) may be implemented as part of another component (e.g., the camera module 180 or the communication module 190) functionally related to the auxiliary processor 123. The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 is software stored in the memory 130, and may include, for example, an operating system (OS) 142, middleware 144, or an application 146.

The input device 150 is a device configured to receive a command or data to be used by other component (e.g., the processor 120) of the electronic device 101, from the outside (e.g., a user) of the electronic device 101, and may include, for example, a microphone, a mouse, or a keyboard.

The sound output device 155 is a device configured to output sound signals to the outside of the electronic device 101. The sound output device 155, and may include, for example, a speaker or a receiver. The speaker may be used for general purposes, such as playing multimedia or playing record, and the receiver may be used only for incoming calls. According to an embodiment, the receiver may be implemented as separate from, or as part of the speaker.

The display device 160 is a device configured to visually provide information to a user of the electronic device 101, and may include, for example, a display, a hologram device, or a projector and control circuitry to control a corresponding one of the display, hologram device, and projector. According to an embodiment, the display device 160 may include touch circuitry or a pressure sensor adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or an external electronic device (e.g., an electronic device 102 (e.g., a speaker or a headphone)) wiredly or wirelessly coupled with the electronic device 101.

The sensor module 176 may generate an electrical signal or data value corresponding to an operational state (e.g., power or temperature) of the electronic device 101 or an environmental state external to the electronic device 101. The sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support specified protocols to be used for the electronic device 101 to be coupled with the external electronic device (e.g., the electronic device 102) wiredly or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102), for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. The haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 is a module configured to manage power supplied to the electronic device 101, and may be implemented as at least part of, for example, a power management integrated circuit (PMIC).

The battery 189 is a device configured to supply power to at least one component of the electronic device 101, and may include, for example, a primary cell which is not rechargeable, a secondary cell which is rechargeable, or a fuel cell.

The communication module 190 may support establishing a wired communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a wired communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules 190 may be implemented as a single chip, or may be implemented as separate chips, respectively.

According to an embodiment, the wireless communication module 192 may identify and authenticate the electronic device 101 in a communication network, using user information stored in the subscriber identification module 196.

The antenna module 197 may include at least one antenna module for transmitting or receiving a signal or power to or from the outside of the electronic device 101. According to an embodiment, the communication module 190 (e.g., the wireless communication module 192) may transmit or receive a signal to or from the external electronic device via an antenna appropriate for a communication scheme.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at another external device or a plurality of external electronic devices. According to an embodiment, if the electronic device 101 should perform a function or a service automatically, or in response to a request from a user or another device, the electronic device 101, instead of, or in addition to, executing the function or the service, may request the external electronic devices to perform at least part of the function related thereto. The external electronic devices receiving the request may perform the requested function or the service and transfer an outcome of the performing to the electronic device 101. The electronic device 101 may provide the requested function or the service, with or without further processing of the outcome. To that end, a cloud computing, distributed computing, or client-server computing technology may be used, for example.

Figure 2:
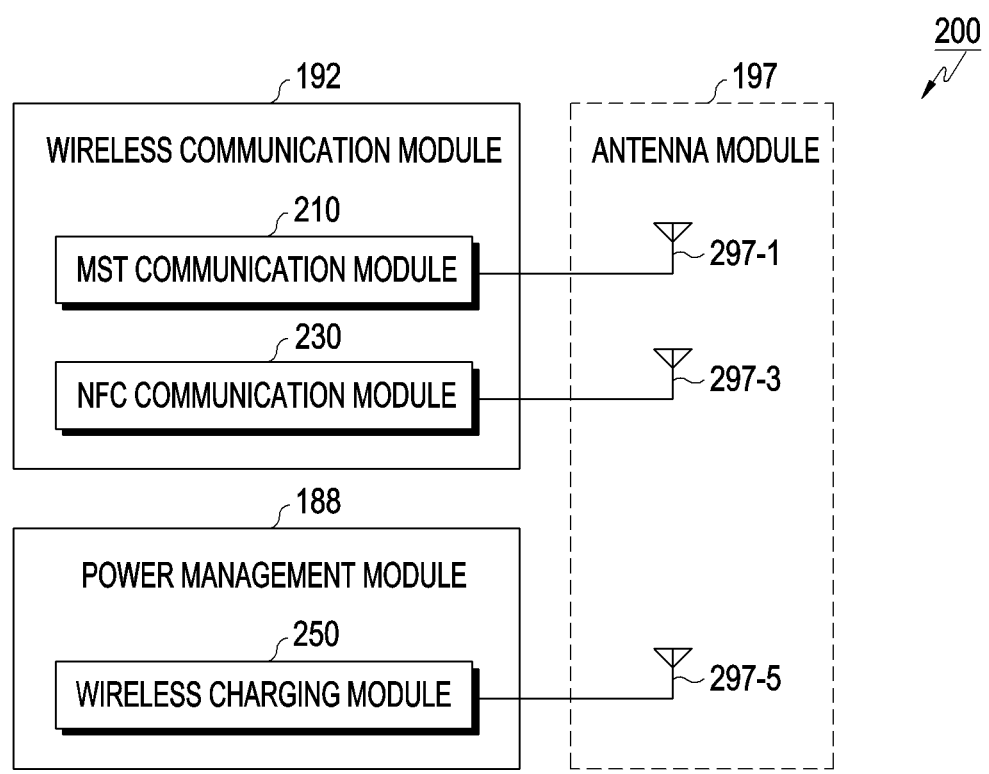
FIG. 2 is a block diagram 200 illustrating a wireless communication module 192, a power management module 188, and an antenna module 197 of an electronic device 101 according to various embodiments.

FIG. 2 is a block diagram 200 illustrating the wireless communication module 192, the power management module 188, and the antenna module 197 of the electronic device 101 according to various embodiments.

Referring to FIG. 2, the wireless communication module 192 may include a magnetic secure transmission (MST) communication module 210 or a near-field communication (NFC) module 230, and the power management module 188 may include a wireless charging module 250. In such a case, the antenna module 297 may include a plurality of antennas that include a MST antenna 297-1 connected with the MST communication module 210, a NFC antenna 297-3 connected with the NFC communication module 230, and a wireless charging antenna 297-5 connected with the wireless charging module 250. For ease of description, the same components as those described in regard to FIG. 1 are briefly described or omitted from the description. The wireless communication module 192, the power management module 188, and the antenna module 197 may be disposed within the housing of the wireless power transmission device 101.

The MST communication module 210 may receive a signal (e.g., a signal containing control information or payment information) from the processor 120, generate a magnetic signal corresponding to the received signal, and then transfer the generated magnetic signal to the external electronic device 102 (e.g., a point-of-sale (POS) device) via the MST antenna 297-1. According to an embodiment, for example, the MST communication module 210 may include a switching module (not shown) that includes one or more switches connected with the MST antenna 297-1, and control the switching module to change the direction of voltage or current supplied to the MST antenna 297-1. The change of the direction of the voltage or current allows the direction of the magnetic signal (e.g., a magnetic field) emitted from the MST antenna 297-1, for example, transferred to the external electronic device 102 via wireless short-range communication 198. The magnetic signal transferred with its direction changing may cause a form and an effect similar to that of a magnetic field that is generated when a magnetic card is swiped through a card reader of the electronic device 102. According to an embodiment, for example, payment-related information and a control signal that are received by the electronic device 102 in the form of the magnetic signal may be further transmitted to a payment server (e.g., an external server 108) via the network 199.

The NFC communication module 230 may obtain a signal (e.g., a signal containing control information or payment information) from the processor 120 and transmit the obtained signal to the external electronic device 102 via the NFC antenna 297-3. According to an embodiment, the NFC communication module 230 may receive such a signal (e.g., a signal containing control information or payment information) transmitted from the external electronic device 102 via the NFC antenna 297-3.

The wireless charging module 250 may wirelessly transmit power to the external electronic device 102 (e.g., a cellular phone or wearable device) via the wireless charging antenna 297-5, or wirelessly receive power from the external electronic device 102 (e.g., a wireless charging device). The wireless charging module 250 may support one or more of various wireless charging schemes including, for example, a magnetic resonance scheme or a magnetic induction scheme.

According to an embodiment, some of the MST antenna 297-1, the NFC antenna 297-3, or the wireless charging antenna 297-5 may share at least part of their radiators. For example, the radiator of the MST antenna 297-1 may be used as the radiator of the NFC antenna 297-3 or the wireless charging antenna 297-5, or vice versa. When the MST 297-1, the NFC antenna 297-3, or the wireless charging antenna 297-5 shares at least part of their radiators, the antenna module 297 may include a switching circuit (not shown) adapted to selectively connect or disconnect (e.g. open) at least part of the antennas 297-1, 297-3, or 297-5, for example, under the control of the wireless communication module 192 (e.g., the MST communication module 210 or the NFC communication module 230) or the power management module (e.g., the wireless charging module 250). For example, when the electronic device 101 uses a wireless charging function, the NFC communication module 230 or the wireless charging module 250 may control the switching circuit to temporarily disconnect at least one portion of the radiators shared by the NFC antenna 297-3 and the wireless charging antenna 297-5 from the NFC antenna 297-3 and to connect the at least one portion of the radiators with the wireless charging antenna 297-5.

According to an embodiment, at least one function of the MST communication module 210, the NFC communication module 230, or the wireless charging module 250 may be controlled by an external processor (e.g., the processor 120). According to an embodiment, specified functions (e.g., a payment function) of the MST communication module 210 or the NFC communication module 230 may be performed in a trusted execution environment (TEE). According to an embodiment, the TEE may form an execution environment in which, for example, at least some designated area of the memory 130 is allocated to be used for performing a function (e.g., a financial transaction or personal information-related function) that requires a relatively high level of security. In such a case, access to the at least some designated area of the memory 130 may be restrictively permitted, for example, according to an entity accessing thereto or an application being executed in the TEE.

Figure 3:
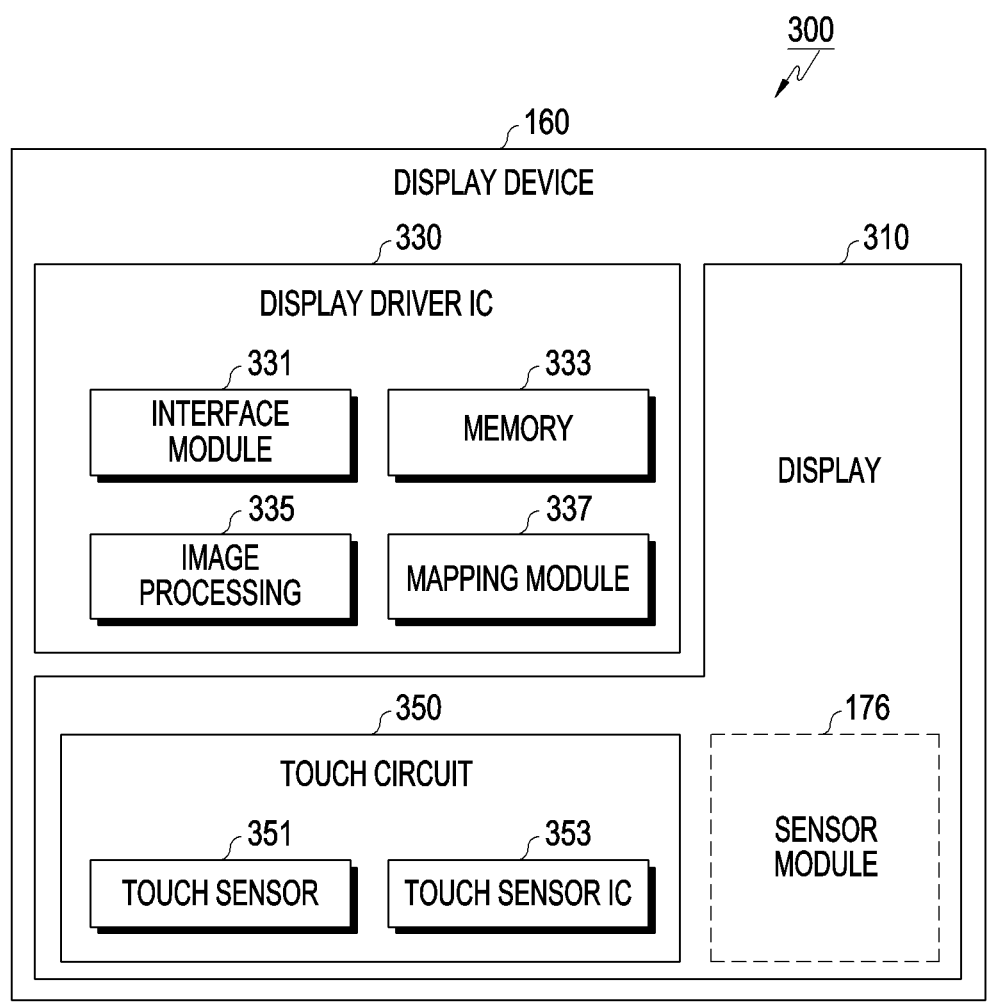
FIG. 3 is a block diagram 300 illustrating a display device 160 according to various embodiments.

FIG. 3 is a block diagram 300 illustrating the display device 160 according to various embodiments.

Referring to FIG. 3, the display device 160 may include a display 310 and a display driver integrated circuit (IC) (DDI) 330 to control the display 310. The DDI $30 may include an interface module 331, memory 333 (e.g., buffer memory), an image processing module 335, or a mapping module 337. The DDI $30 may receive image information that contains image data or an image control signal corresponding to a command to control the image data from the processor 120 (e.g., the main processor 121 (e.g., an application processor)) or the auxiliary processor 123 operated independently from the function of the main processor 121) via the interface module 331. The DDI 330 may communicate, for example, with touch circuitry 350 or the sensor module 176 via the interface module 331. The DDI 330 may also store at least part of the received image information in the memory 333, for example, on a frame by frame basis. The image processing module 335 may perform pre-processing or post-processing (e.g., adjustment of resolution, brightness, or size) with respect to at least part of the image data, based at least in part on one or more characteristics of the image data or one or more characteristics of the display 310. The mapping module 337 may convert the image data pre-processed or post-processed by the image processing module 135 to a voltage value or a current value capable of driving pixels, based at least in part on attributes of the pixels (e.g., an array, such as an RGB stripe or a pentile structure, of the pixels, or the size of each subpixel). At least some pixels of the display 310 may be driven, for example, based on the voltage value or the current value such that visual information (e.g., a text, an image, or an icon) corresponding to the image data may be displayed via the display 310.

According to an embodiment, the display device 160 may further include the touch circuitry 350. The touch circuitry 350 may include a touch sensor 351 and a touch sensor IC 353 to control the touch sensor 351. The touch sensor IC 353 may control the touch sensor 351 to sense a touch input or a hovering input with respect to a certain position on the display 310. To achieve this, for example, the touch sensor 351 may measure a change in a signal (e.g., a voltage, a quantity of light, a resistance, or a quantity of one or more electric charges) corresponding to the certain position on the display 310. The touch circuitry 350 may provide information (e.g., a position, an area, a pressure, or a time) indicative of the detected touch input or the hovering input to the processor 120. According to an embodiment, at least part (e.g., the touch sensor IC 353) of the touch circuitry 350 may be formed as part of the display 310 or the DDI 330, or as part of another component (e.g., the auxiliary processor 123) disposed outside the display device 160.

According to an embodiment, the display device 160 may further include at least one sensor (e.g., a fingerprint sensor, an iris sensor, a pressure sensor, or an illuminance sensor) of the sensor module 176 or a control circuit for the at least one sensor. In such a case, the at least one sensor or the control circuit for the at least one sensor may be embedded in one portion of a component (e.g., the display 310, the DDI 330, or the touch circuitry 350)) of the display device 160. For example, when the sensor module 176 embedded in the display device 160 includes a biometric sensor (e.g., a fingerprint sensor), the biometric sensor may obtain biometric information (e.g., a fingerprint image) corresponding to a touch input received via a portion of the display 310. As another example, when the sensor module 176 embedded in the display device 160 includes a pressure sensor, the pressure sensor may obtain pressure information corresponding to a touch input received via a partial or whole area of the display 310. According to an embodiment, the touch sensor 351 or the sensor module 176 may be disposed between pixels in a pixel layer of the display 310, or over or under the pixel layer.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above. The battery device according to various embodiments disclosed herein may include an electronic device including at least one battery that can supply power to at least one electronic device.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form may include plural referents, unless the context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. Such terms as "1st" and "2nd," or "first" and "second" may indicate the corresponding components regardless of order or importance and may be used to simply distinguish a corresponding component from another, and does not limit the components in other aspect. It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly, or via another element (e.g. a third element).

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). The machine is a device which may invoke the stored instruction from the storage medium and operate according to the invoked instruction, and may include an electronic device (e.g., the electronic device 101) according to the disclosed embodiments. When the instruction is executed by a processor (e.g., the processor 120), the processor may perform functions corresponding to the instruction by itself or by using other components under the control of the processor. The instruction may include a code generated by a complier or a code executable by an interpreter. The machine-readable storage medium may be provided in the form of a non-transitory storage medium. Wherein, the term "non-transitory" simply means that the storage medium is a tangible device, and does not include a signal, but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed online via an application store (e.g., PlayStore™). If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, some of the above-described sub-components may be omitted, or other sub-components may be added. Alternatively or additionally, some components (e.g., modules or programs) may be integrated into a single entity, and the integrated component may still perform one or more functions of each of some components in the same or similar manner as they are performed by a corresponding one of some components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 4:
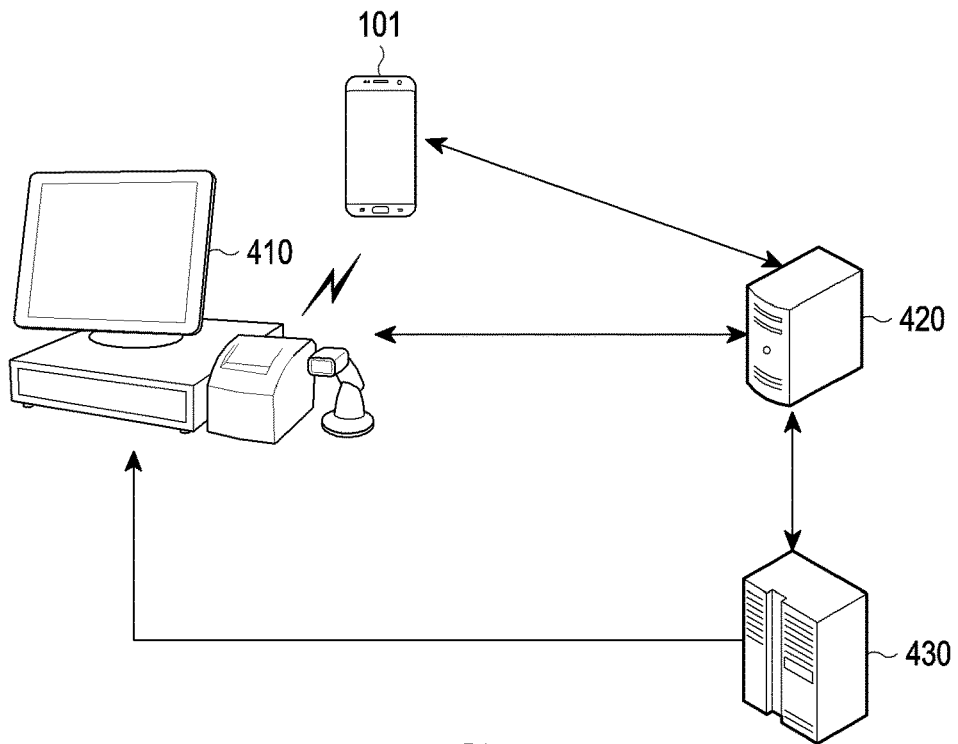
FIG. 4 is an exemplary diagram illustrating a payment system according to various embodiments.

FIG. 4 is an exemplary diagram illustrating a payment system according to various embodiments.

Referring to FIG. 4, the payment system according to various embodiments may include an electronic device 101, an external payment device 410, a first external server 420, and a second external server 430.

According to various embodiments, the electronic device 101 may include an operating system for controlling one or more resources (e.g., the operating system 142 of FIG. 1), a middleware (e.g., the middleware 144 of FIG. 1), or an application (e.g., the application 146 of FIG. 1) that can be operated on the operating system. The operating system may include, for example, Android™, iOS™, Windows™, Symbian™, Tizen™, or Bada™. At least some of a programs (e.g., the program 140 of FIG. 1) may be preloaded on the electronic device 101 at the time of manufacture, or may be downloaded or updated from an external electronic device (e.g., the electronic device 102 or 104 or the server 108) in a use environment of a user. The operating system may control (e.g., allocate or retrieve) system resources (e.g., process, memory, or power) of the electronic device 101. The middleware may provide various functions as an application (e.g., 146 in FIG. 1) so that the application (e.g., 146 in FIG. 1) can use functions or information provided by one or more resources of the electronic device 101. The application may include an application that provides a payment service. The electronic device 101 may include a payment service client application and a payment service framework for performing a payment service.

According to various embodiments, the electronic device 101 may perform a transaction with the external payment device 410. The external payment device 410 is a device that receives payment for a product or service provided to a user, and may include a point of sales/point-of-service (POS) terminal device. The electronic device 101 may perform a transaction with the external payment device 410 through a first wireless communication circuit (e.g., near-distance wireless communication circuit), and may receive a transaction result from an external server 420 through a second wireless communication circuit (e.g., cellular wireless communication circuit). The electronic device 101 may receive the transaction result including receipt information from the first external server 420 through the second wireless communication circuit (e.g., cellular wireless communication circuit) by using an application (e.g., payment service client application). The electronic device 101 may transmit a request for a refund to the external payment device 410. After performing the transaction according to the purchase of the product, when the request for the refund is received from the user through the user interface, the electronic device 101 may transmit the request for the refund to the external payment device 410. The electronic device 101 may receive information on the refund from the external server 420. The electronic device 101 may receive information including a result of the refund from the external server 420 through the second wireless communication circuit (e.g., cellular wireless communication circuit).

According to various embodiments, the first external server 420 may manage receipt information (e.g., payment details) based on a payment means. The first external server 420 may include a payment service client application and a payment service framework for performing a payment service. For example, the first external server 420 is a server that manages receipt information by various payment means (e.g., Samsung Pay) used for payment, and may include a server of a company that provides the above payment means. When payment is made, the first external server 420 may check a receipt according to the purchase of the product. The first external server 420 may store transaction details and receipt information and may process receipt authentication. When the request is received from the external payment device 410, the first external server 420 may authenticate the receipt using a public key, and when the receipt is authenticated, the first external server 420 may request validity check from the second external server 430. According to an embodiment, the second external server 430 may include a server of a card company based on various cards (e.g., credit cards, check cards, or point cards) used for payment. The second external server 430 may transmit a check result for the validity check request received from the first external server 420, to the external payment device 410 or the first external server 420.

According to various embodiments, the electronic device 101 may include: a housing; a first wireless communication circuit (near-distance wireless communication circuit) (e.g., 210 or 230 of FIG. 2); a second wireless communication circuit (cellular wireless communication circuit) (the communication module 190 of FIG. 1); a touchscreen display (e.g., the display device 160 of FIG. 1) configured to be exposed through one side of the housing; a processor (e.g., the processor 120 of FIG. 1) configured to be disposed in the housing and to be operatively connected to the first wireless communication circuit, the second wireless communication circuit, and the touchscreen display; and a memory 130 configured to be disposed in the housing and to be operatively connected to the processor, wherein the memory may store an application program (e.g., the application 146 of FIG. 1) configured to make a payment by using the first wireless communication circuit, and may store instructions which, when executed, cause the processor 120 to: perform a transaction with an external payment device through the first wireless communication circuit by using the application program; receive a transaction result including receipt information from an external server (e.g., the server 420 of FIG. 4) through the second wireless communication circuit by using the application program; after the transaction result is received; transmit a request for a refund to the external payment device (the external payment device 410 of FIG. 4) through the first wireless communication circuit by using the application program on the basis of the received transaction result, the request for the refund including at least one of a transaction store, a transaction date, an approval number, a transaction item, a transaction quantity, and a transaction identifier (ID); and receive information on the refund from the external server through the second wireless communication circuit by using the application program.

According to an embodiment, the first wireless communication circuit may be configured with a magnetic secure transmission (MST) and/or near field communication (NFC).

According to an embodiment, the request may include at least one of a file or a uniform resource locator (URL).

According to an embodiment, the application program may include a user interface configured to receive the request for the refund from a user.

The instructions may include instructions that, when executed, cause the processor 102 to display a code on the user interface displayed on the touchscreen display (e.g., the display device 160 of FIG. 1) on the basis of at least some of the at least one of the transaction store, the transaction date, the approval number, the transaction item, the transaction quantity, and the transaction ID.

According to an embodiment, the code may include a bar code or a quick response (QR) code.

According to an embodiment, the instructions may further include instructions that cause the processor 120 to display the code and/or transmit the request for the refund in response to selection of the user through the user interface.

According to an embodiment, the instructions may include instructions that cause the processor 120 to identify a type of the external payment device on the basis of the received transaction result in order to transmit the request for the refund, and to transmit the request for the refund to the external payment device on the basis of the identified type.

According to an embodiment, the instructions may include instructions that, when executed, cause the processor 120 to request a public key from the external server, to receive the public key in response to the request, and to encrypt the request for the refund on the basis of the received public key.

According to an embodiment, the instructions may include instructions that, when executed, cause the processor 120 to extract payment details when a user selection for transmitting the receipt information is received, to generate a file including the extracted payment details, and to transmit the generated file.

According to an embodiment, the instructions may include instructions that, when executed, cause the processor 120 to display a list of users to share with through the touchscreen display (e.g., the display device 160 of FIG. 1) when a user selection for sharing the receipt information is received, to generate a file to be transmitted to an electronic device of at least one user selected from the displayed user list, and to transmit the generated file.

According to an embodiment, the instructions may include instructions that, when executed, cause the processor 120 to collect, when at least one piece of receipt information is received from the electronic device of the selected at least one user, the received at least one piece of receipt information to calculate a payment amount for each user, and to transmit information on the calculated payment amount to each user.

According to an embodiment, the instructions may include instructions that, when executed, cause the processor 120 to collect, when at least one piece of receipt information is received from the selected at least one user, the received at least one piece of receipt information to transmit the collected information to the external server, and to receive information on the calculated payment amount from the external server on the basis of the collected at least one piece of receipt information.

According to various embodiments, the electronic device 101 may include: a housing; a first wireless communication circuit (e.g., 210 or 230 of FIG. 2); a second wireless communication circuit (the communication module 190 of FIG. 1); a touchscreen display (e.g., the display device 160 of FIG. 1) configured to be exposed through one side of the housing; a processor (e.g., the processor 120 of FIG. 1) configured to be disposed in the housing and to be operatively connected to the first wireless communication circuit, the second wireless communication circuit, and the touchscreen display; and a memory 130 configured to be disposed in the housing and to be operatively connected to the processor, wherein the memory may store an application program (the application 146 of FIG. 1) configured to make a payment by using the first wireless communication circuit, and may store instructions which, when executed, cause the processor 120 to: perform a transaction with an external payment device through the first wireless communication circuit by using the application program; receive a transaction result including receipt information from an external server through the second wireless communication circuit by using the application program; display the receipt information and a user interface including a user selection for sharing or transmission of the receipt information, encrypt the receipt information on the basis of the selection, and transmit the encrypted receipt information through the second wireless communication circuit.

According to an embodiment, the instructions may include instructions that, when executed, cause the processor 120 to request a public key from the external server, to receive the public key in response to the request, and to encrypt the receipt information on the basis of the received public key.

According to an embodiment, the instructions may include instructions that, when executed, cause the processor 120 to display, when a user selection for sharing the receipt information is received, a list of users to share with through the touchscreen display (e.g., the display device 160 of FIG. 1), to generate a file to be transmitted to an electronic device of at least one user selected from the displayed user list, and to transmit the generated file.

According to an embodiment, the instructions may include instructions that, when executed, cause the processor 120 to collect, when at least one piece of receipt information is received from the electronic device of the selected at least one user, the received at least one piece of receipt information to calculate a payment amount for each user, and to transmit information on the calculated payment amount to each user.

According to an embodiment, the instructions may include instructions that, when executed, cause the processor 120 to collect, when at least one piece of receipt information is received from the selected at least one user, the received at least one piece of receipt information to transmit the collected information to the external server, and receive information on the calculated payment amount from the external server on the basis of the collected at least one piece of receipt information.

According to an embodiment, the instructions may include instructions that, when executed, cause the processor 120 to request a payment activity identifier for donation from the external server, to receive the payment activity identifier from the external server, and to collect payment amounts made by a plurality of users on the basis of the received payment activity identifier to calculate the payment amount for each user.

Figure 5:
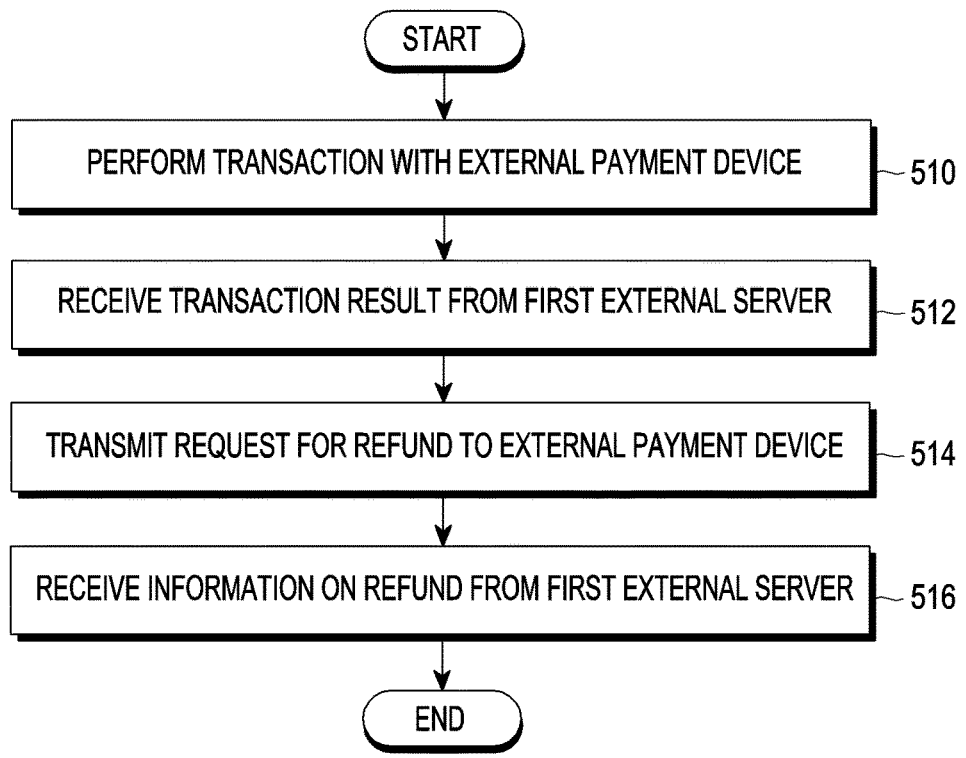
FIG. 5 is a flowchart illustrating an operation of controlling payment in an electronic device according to various embodiments.

FIG. 5 is a flowchart illustrating an operation of controlling payment in an electronic device according to various embodiments.

Hereinafter, an operation of controlling payment in an electronic device will be described in detail with reference to FIG. 5 as follows.

According to various embodiments, in operation 510, the electronic device 101 (e.g., the processor of FIG. 1) may perform a transaction with the external payment device 410. According to an embodiment, the electronic device 101 (e.g., the processor of FIG. 1) may perform a transaction with the external payment device 410 through a first wireless communication circuit (e.g., near-distance wireless communication circuit). The first wireless communication circuit may include at least one of magnetic secure transmission (MST) or near field communication (NFC). The electronic device 101 (e.g., the processor of FIG. 1) may include various payment means (e.g., Samsung Pay) for providing a payment service according to product purchase. In the electronic device 101 (e.g., the processor of FIG. 1), an application or plug-in provided by a company that provides a payment service by the payment means is installed. The electronic device 101 (e.g., the processor of FIG. 1) may include a payment service client application and a payment service framework for performing a payment service. The electronic device 101 (e.g., the processor of FIG. 1) may perform interaction with a user through the payment service client application, and may perform communication for payment with the external payment device through the payment service framework.

According to various embodiments, in operation 512, the electronic device 101 (e.g., the processor of FIG. 1) may receive a transaction result from the first external server 420. According to an embodiment, the electronic device 101 (e.g., the processor of FIG. 1) may receive the transaction result including receipt information from the first external server 420 through the second wireless communication circuit (e.g., cellular wireless communication circuit) by using an application program (e.g., payment service client application). According to an embodiment, the electronic device 101 (e.g., the processor of FIG. 1) may perform a transaction for payment with the external payment device 410 on the basis of the product purchase, and may receive the transaction result according to the performed transaction from the first external server 420 through the second wireless communication circuit. The transaction result may be displayed through the display device 160 (e.g., touchscreen display) of the electronic device 101. The application program may include a user interface configured to receive a user selection for refund, sharing, or transmission for payment. The transaction result may include at least one of a transaction date, an approval number, a transaction item, a transaction quantity, or a transaction ID. The application program may display a code based on at least some of at least one of the transaction date, the approval number, the transaction item, the transaction quantity, or the transaction ID on the user interface displayed on a touchscreen display.

According to various embodiments, the electronic device 101 (e.g., the processor of FIG. 1) may extract payment details when an input for transmitting the receipt information is received through the user interface. When the input for transmitting the receipt information to at least one recipient is received while the transaction result according to the product purchase is displayed on the user interface, the electronic device 101 (e.g., the processor of FIG. 1) may extract payment details. When the payment details are extracted, the electronic device 101 (e.g., the processor of FIG. 1) may generate a file including the extracted payment details.

According to various embodiments, when an input for sharing receipt information with at least one recipient is received through the user interface, the electronic device 101 (e.g., the processor of FIG. 1) may display a list of users who can receive the corresponding information through the touchscreen display. When the input for sharing the receipt information with the at least one recipient is received while the transaction result according to the product purchase is displayed on the user interface, the user list may be displayed through the touchscreen display. When at least one user to share with is selected from the displayed user list, the electronic device 101 (e.g., the processor of FIG. 1) may extract payment details and may generate a file including the extracted payment details. The electronic device 101 (e.g., the processor of FIG. 1) may transmit the generated file to each of the selected users. The electronic device 101 (e.g., the processor of FIG. 1) may transmit the generated file to each of the selected users through the second wireless communication circuit (e.g., cellular wireless communication circuit).

According to various embodiments, when at least one piece of receipt information is received from the electronic device of the selected at least one user, the electronic device 101 (e.g., the processor of FIG. 1) may collect the received at least one piece of receipt information to calculate a payment amount for each user. For example, if a payment amount made by a first user (e.g., the user of the electronic device 101) is 10000 won, a payment amount made by a second user is 15000 won, and a payment amount made by a third user is 5000 won, the total payment amount is 30000 won, and the average payment amount is 10000 won. Therefore, the electronic device 101 (e.g., the processor of FIG. 1) may transmit, to the electronic device of the third user, a request to transmit the amount of 5000 won obtained by deducting 5000 won paid by the third user from 10000 won which is the average payment amount to the second user. In addition, the electronic device 101 (e.g., the processor of FIG. 1) may transmit, to the electronic device of the second user, a message informing that the average payment amount is 10000 won and 5000 won can be received from the third user.

According to various embodiments, when the at least one piece of receipt information is received from the electronic device of the selected at least one user, the electronic device 101 (e.g., the processor of FIG. 1) may collect the received at least one piece of receipt information to transmit the collected information to the first external server 420, and may receive information on the payment amount calculated on the basis of the collected at least one piece of receipt information from the first external server 420. The electronic device 101 (e.g., the processor of FIG. 1) may request a payment activity identifier for contributing to costs used by the second and third users from the first external server 420, and may receive the payment activity identifier from the first external server 420. The electronic device 101 (e.g., the processor of FIG. 1) may collect costs paid by first to third users on the basis of the received payment activity identifier, and may calculate a payment amount for each user. According to an embodiment, when an identifier of the electronic device 101 is included in the request for the payment activity identifier, the electronic device 101 (e.g., the processor of FIG. 1) may collect the receipt information received from each of the users to calculate the payment amount for each of the users. According to an embodiment, when identifiers of the first to third users are included in the request for the payment activity identifier, the electronic device 101 (e.g., the processor of FIG. 1) may receive the payment amount using the electronic device 101 from the first external server 420.

According to various embodiments, in operation 514, the electronic device 101 (e.g., the processor of FIG. 1) may transmit a request for a refund to the external payment device 410. After a transaction according to the product purchase is performed, when the request for the refund is received from the user through the user interface, the electronic device 101 (e.g., the processor of FIG. 1) may transmit the request for the refund to the external payment device 410 through the first wireless communication circuit (e.g., near-distance wireless communication circuit). The electronic device 101 (e.g., the processor of FIG. 1) may convert the request for the refund into a file or URL to transmit the file or URL to the application or plug-in of the external payment device 410. The user interface may include a code based on at least some of the at least one of the transaction date, the approval number, the transaction item, the transaction quantity, and the transaction ID. The code may include a bar code or a QR code. The electronic device 101 (e.g., the processor of FIG. 1) may transmit the code or the request for the refund to the external payment device 410 through the first wireless communication circuit (e.g., near-distance wireless communication circuit) in response to a user selection through the user interface. In order to transmit the request for the refund to the external payment device 410, the electronic device 101 (e.g., the processor of FIG. 1) may identify a type of the external payment device 410 and may transmit the request for the refund to the external payment device 410 on the basis of the identified type. According to an embodiment, when the request for the refund is received, the electronic device 101 (e.g., the processor of FIG. 1) may request a public key from the first external server 420 through the second wireless communication circuit (e.g., cellular wireless communication circuit), and may receive the public key through the second wireless communication circuit (e.g., cellular wireless communication circuit) in response to the request. When the request for the refund is received, the electronic device 101 (e.g., the processor of FIG. 1) may request the public key from the first external server 420, and may receive the public key in response to the request. The electronic device 101 (e.g., the processor of FIG. 1) may encrypt the request for the refund on the basis of the received public key, and may transmit the encrypted request to the external payment device 410 through the first wireless communication circuit (e.g., near-distance wireless communication circuit). When the request for the refund is received, the electronic device 101 (e.g., the processor of FIG. 1) may select the corresponding payment item from the payment details. When a receipt to be refunded is selected by the user, the electronic device 101 (e.g., the processor of FIG. 1) may identify a refund method (e.g., MST, NFC, bar code, data display required for refund processing, etc.) supported by the external payment device 410 through receipt information on the receipt. The electronic device 101 (e.g., the processor of FIG. 1) may transmit data required for processing the refund on the basis of the identified refund method to the external payment device 410 through the near-distance wireless communication circuit. The electronic device 101 (e.g., the processor of FIG. 1) may request payment cancellation by transmitting the data required for processing the refund to the external payment device 410 through MST or NFC. The request may include at least one of a file or a URL, and may include at least one of a transaction store, a transaction date, a card name, a transaction item, an approval number, a transaction quantity, or a transaction ID.

According to various embodiments, in operation 516, the electronic device 101 (e.g., the processor of FIG. 1) may receive information on the refund from the first external server 420. The electronic device 101 may receive information including a result of the refund from the first external server 420 through the second wireless communication circuit (e.g., cellular wireless communication circuit). The result of the refund may be displayed through the user interface.

According to various embodiments, a method of controlling payment in the electronic device 101 (e.g., the processor of FIG. 1) may include: performing a transaction with an external payment device through a first wireless communication circuit (e.g., 210 or 230 of FIG. 2) by using an application program (the application 146 of FIG. 1); receiving a transaction result including receipt information from a first external server (e.g., the server 420 of FIG. 4) through second wireless communication (the communication module 190 of FIG. 1) by using the application program; after the transaction result is received, transmitting a request for a refund including at least one of a transaction store, a transaction date, an approval number, a transaction item, a transaction quantity, or a transaction identifier to the external payment device (e.g., the external payment device 410) through the first wireless communication on the basis of the received transaction result; and receiving information on the refund from the first external server (e.g., the server 420 of FIG. 4) through the second wireless communication by using the application program.

According to an embodiment, the method may further include displaying a code based on at least some of the transaction store, the transaction date, the approval number, the transaction item, the transaction quantity, or the transaction identifier on the user interface displayed on the touchscreen display.

According to an embodiment, the code may be displayed and/or the request for the refund may be transmitted, in response to a user selection through the user interface.

According to an embodiment, the method may further include identifying a type of the external payment device on the basis of the received transaction result to transmit the request for the refund; and transmitting the request for the refund to the external payment device on the basis of the identified type.

According to an embodiment, the method may further include: requesting a public key from an external server; receiving the public key in response to the request; and encrypting the request for the refund on the basis of the received public key.

According to an embodiment, when an input for transmitting the receipt information is received, the method may further include, extracting payment details; generating a file including the extracted payment details; and transmitting the generated file.

According to an embodiment, when an input for sharing the receipt information is received, the method may further include: displaying a list of users to share with through the touchscreen display; generating a file to be transmitted to an electronic device of at least one user selected from the displayed user list; and transmitting the generated file.

According to an embodiment, when at least one piece of receipt information is received from the electronic device of the selected at least one user, the method may further include collecting the received at least one piece of receipt information to calculate a payment amount for each user; and transmitting information on the calculated payment amount to each user.

According to an embodiment, when the at least one piece of receipt information is received from the selected at least one user, the method may further include collecting the received at least one piece of receipt information to transmit the collected information to the external server; and receiving information on the calculated payment amount from the external server on the basis of the collected at least one piece of receipt information.

According to an embodiment, the method may further include: requesting a payment activity identifier for donation from the external server; receiving the payment activity identifier from the server; and collecting costs paid by a plurality of users on the basis of the received payment activity identifier to calculate the payment amount for each user.

According to an embodiment, when an identifier of the electronic device is included in the request for the payment activity identifier, the method may further include collecting receipt information received from each user to calculate the payment amount for each user.

According to an embodiment, when identifiers of the plurality of users are included in the request for the payment activity identifier, the method may further include receiving the payment amount using the electronic device from the external server.

Figure 6A:
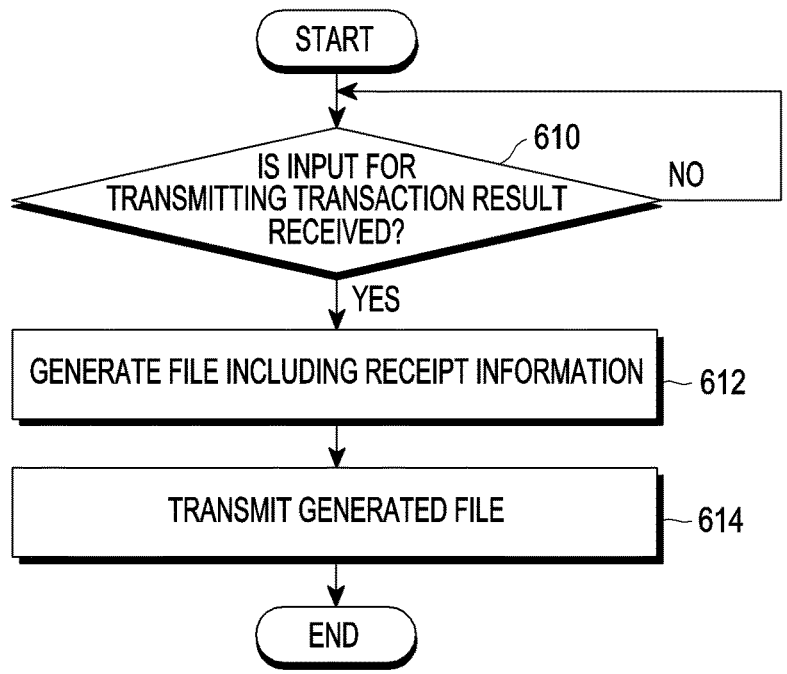
FIG. 6A is a flowchart illustrating an operation of generating and transmitting a file including receipt information in an electronic device according to various embodiments.
Figure 6B:
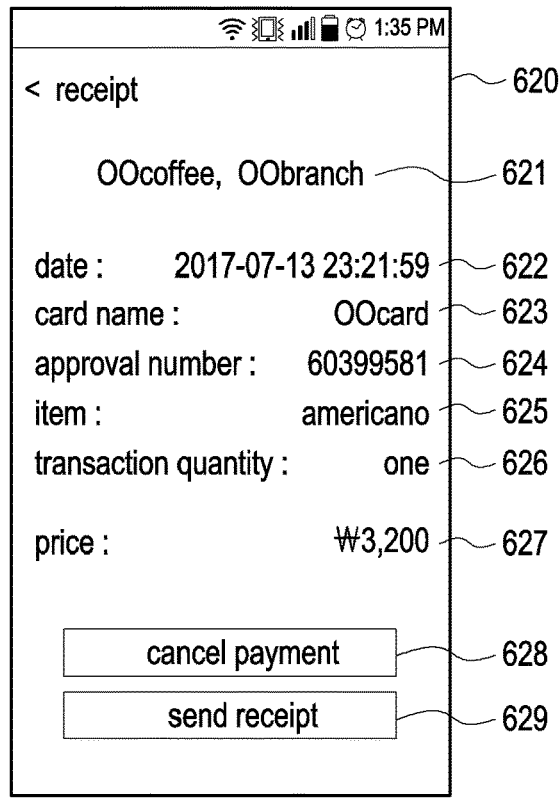
FIG. 6B is an exemplary diagram illustrating a user interface for transmitting receipt information in an electronic device according to various embodiments.

FIG. 6A is a flowchart illustrating an operation of generating and transmitting a file including receipt information in an electronic device according to various embodiments, and FIG. 6B is an exemplary diagram illustrating a user interface for transmitting receipt information in an electronic device according to various embodiments.

Hereinafter, the operation of generating and transmitting the file including the receipt information in the electronic device will be described in detail with reference to FIGS. 6A and 6B as follows.

According to various embodiments, in operation 610, the electronic device 101 (e.g., the processor of FIG. 1) may receive an input for transmitting a transaction result. For example, when a company employee sends payment contents to a company for the purpose of an expense claim or when a user sends hospital payment contents to an insurance company to claim insurance premiums, the corresponding transaction result should be transmitted or shared. In this case, the electronic device 101 may receive a request to transmit a receipt from the user through a user interface 620 including receipt information. The user interface 620 may include a transaction store 621, a transaction date 622, a card name 623, an approval number 624, a transaction item 625, a transaction quantity 626, a transaction identifier, cancel payment 628, or send receipt (or receipt sending) 629. The user interface 620 may include a code based on at least some of at least one of the transaction store 621, the transaction date 622, the card name 623, the approval number 624, the transaction item 625, the transaction quantity 626, or the transaction identifier. The code may include a bar code or a QR code. The electronic device 101 (e.g., the processor of FIG. 1) may receive an input for transmitting receipt information through the send receipt 629 of the user interface 620.

According to various embodiments, in operation 612, the electronic device 101 (e.g., the processor of FIG. 1) may generate a file including the receipt information. When an input for transmitting the receipt information through the send receipt 629 of the user interface 620 is received, the electronic device 101 (e.g., the processor of FIG. 1) may extract payment details. When the input for transmitting the receipt information to at least one recipient is received through the send receipt 629 while the transaction result according to product purchase is displayed on the user interface 620, the electronic device 101 (e.g., the processor of FIG. 1) may extract the payment details. When the payment details are extracted, the electronic device 101 may generate a file including the extracted payment details. The generated file may include at least one of the transaction store, the transaction date, the card name, the transaction item, the approval number, the transaction quantity, or the transaction identifier.

According to various embodiments, in operation 614, the electronic device 101 (e.g., the processor of FIG. 1) may transmit the generated file. According to an embodiment, the electronic device 101 may transmit the file including the at least one of the extracted transaction store, transaction date, card name, transaction item, approval number, transaction quantity, or transaction identifier to the at least one recipient through the second wireless communication circuit (e.g., cellular wireless communication circuit). When a telephone number, email address, and the like of the recipient receiving the generated file are input, the electronic device 101 may transmit the generated file on the basis of the input information.

Figure 7A:
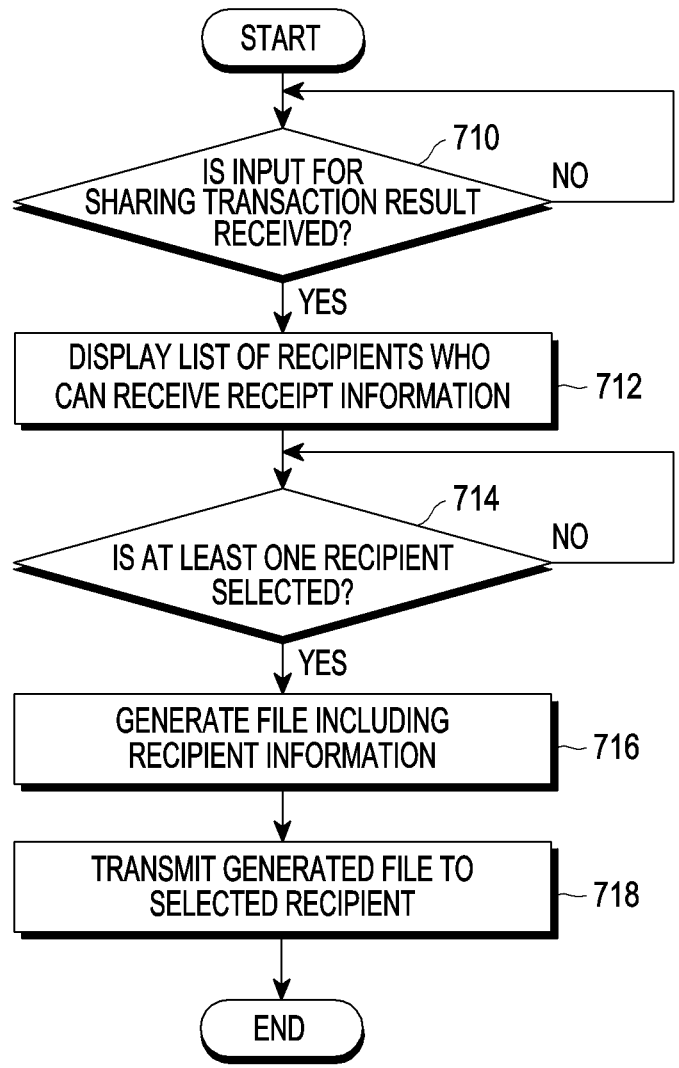
FIG. 7A is a flowchart illustrating an operation of generating a file including receipt information and transmitting the generated file to a plurality of recipients in an electronic device according to various embodiments.

FIG. 7A is a flowchart illustrating an operation of generating a file including receipt information and transmitting the generated file to a plurality of recipients in an electronic device according to various embodiments.

Hereinafter, an operation of generating a file including receipt information and transmitting the generated file to a plurality of recipients according to various embodiments will be described in detail with reference to FIG. 7A as follows.

According to various embodiments, in operation 710, the electronic device 101 (e.g., the processor of FIG. 1) may receive an input forسharing a transaction result. The electronic device 101 (e.g., the processor of FIG. 1) may receive the input for sharing the transaction result. For example, the need to transmit or share receipt information may be raised, such as in the case of sharing payment contents in order to handle expenses in a club or the like. In this case, the electronic device 101 (e.g., the processor of FIG. 1) may receive a request to share a receipt from a user through the user interface 620 including the receipt information. The user interface may include a transaction store, a transaction date, a card name, an approval number, a transaction item, a transaction quantity, a transaction identifier, cancel payment, or share receipt (or receipt transmission). The user interface may include a code based on at least some of at least one of the transaction store, the transaction date, the card name, the approval number, the transaction item, the transaction quantity, or the transaction identifier. The code may include a barcode or QR code. The electronic device 101 may receive an input for transmitting the receipt information through the share receipt of the user interface.

According to various embodiments, in operation 712, the electronic device 101 (e.g., the processor of FIG. 1) may display a list of recipients who can receive the receipt information. The electronic device 101 may display a plurality of pre-stored users through the display device 160 (e.g., a touch screen display). Alternatively, the electronic device 101 may receive a user's contact information, email address, etc., for receiving the receipt information through the user interface. The user interface may display, to each user, icons indicating whether to use a payment means (e.g., Samsung Pay). The user interface may display a check box to select each user.

According to various embodiments, in operation 714, the electronic device 101 (e.g., the processor of FIG. 1) may select at least one recipient. The electronic device 101 may select at least one recipient selected by the user through the check box. Alternatively, the electronic device 101 (e.g., the processor of FIG. 1) may select at least one user selected through various methods (e.g., touch, voice input, etc.) other than the check box.

According to various embodiments, in operation 716, the electronic device 101 (e.g., the processor of FIG. 1) may generate a file including the receipt information. The electronic device 101 (e.g., the processor of FIG. 1) may extract payment details when an input for transmitting the receipt information is received through the share receipt of the user interface. When the input for transmitting the receipt information to the at least one recipient is received through the share receipt while a transaction result according to product purchase is displayed on the user interface, the electronic device 101 (e.g., the processor of FIG. 1) may extract payment details. When the payment details are extracted, the electronic device 101 (e.g., the processor of FIG. 1) may generate a file including the extracted payment details. The generated file may include at least one of a transaction store, a transaction date, a card name, a transaction item, an approval number, a transaction quantity, or a transaction identifier.

According to various embodiments, in operation 718, the electronic device 101 (e.g., the processor of FIG. 1) may transmit the generated file to the selected recipient. The electronic device 101 (e.g., the processor of FIG. 1) may transmit the generated file. According to an embodiment, the electronic device 101 (e.g., the processor of FIG. 1) may transmit the file including the at least one of the extracted transaction store, transaction date, card name, transaction item, approval number, transaction quantity, or transaction identifier to the selected recipient through the second wireless communication circuit (e.g., cellular wireless communication circuit). When a telephone number, an email address, and the like of the recipient receiving the generated file are input, the electronic device 101 (e.g., the processor of FIG. 1) may transmit the generated file on the basis the input information. For example, the electronic device 101 (e.g., the processor of FIG. 1) may transmit the generated file to each recipient on the basis of SMS and MMS.

Figure 7B:
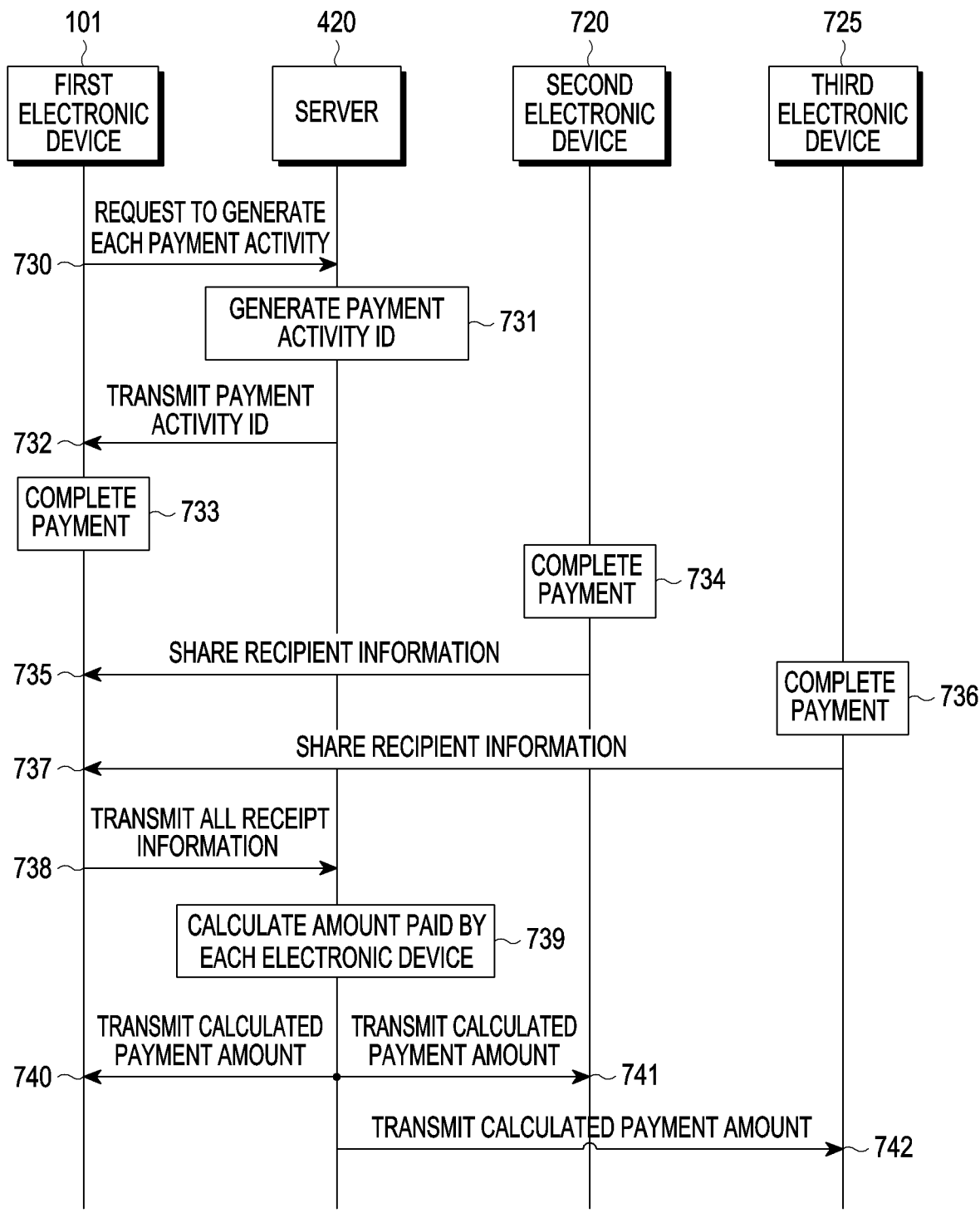
FIG. 7B is an exemplary diagram illustrating an operation in a system for collecting payment amounts made by a plurality of electronic devices and transmitting the payments to each of the electronic devices according to an embodiment.

FIG. 7B is an exemplary diagram illustrating an operation in a system for collecting payment amounts made by a plurality of electronic devices and transmitting the payments to each of the electronic devices according to an embodiment.

Hereinafter, an operation in a system for collecting payment amounts of a plurality of electronic devices and transmitting the collected payment amounts to each electronic device according to an embodiment will be described in detail with reference to FIG. 7B as follows.

According to various embodiments, in operation 730, a first electronic device 101 (e.g., the processor of FIG. 1) may request to generate each payment activity from the server 420. The first electronic device 101 may request a payment activity identifier (ID) for donating costs used by a plurality of users from the server 420 (e.g., the server 108 of FIG. 1). The request for the payment activity identifier may include an identifier of the first electronic device 101, an identifier of a second electronic device 720, and an identifier of a third electronic device 725. The payment activity identifier may be used to collect the total amount paid by the plurality of users, and to calculate the balance to be paid by each user from the collected total amount.

According to various embodiments, in operation 731, the server 420 (e.g., the server 108 of FIG. 1) may generate a payment activity identifier. The server 420 (e.g., the server 108 of FIG. 1) may generate the payment activity identifier on the basis of the request for generating the payment activity received from the first electronic device 101.

According to various embodiments, in operation 732, the server 420 (e.g., the server 108 of FIG. 1) may transmit the payment activity identifier to the first electronic device 101. The server 420 may transmit the generated payment activity identifier to the first electronic device 101.

According to various embodiments, in operation 733, the first electronic device 101 may perform payment. The user of the first electronic device 101 may perform payment at least once. The first electronic device 101 may store the receipt information in the memory 130 on the basis of the payment performed at least once.

According to various embodiments, in operation 734, the second electronic device 720 (e.g., the electronic device 104 of FIG. 1) may perform payment. The user of the second electronic device 720 may perform payment at least once.

According to various embodiments, in operation 735, the second electronic device 720 (e.g., the electronic device 104 of FIG. 1) may share the receipt information with the first electronic device 101. The second electronic device 720 may share the receipt information with the first electronic device 101 on the basis of the payment performed at least once. The second electronic device 720 may transmit the receipt information to the first electronic device 101 to share the receipt information with the first electronic device 101 on the basis of the payment performed at least once. According to an embodiment, whenever the payment is completed, the second electronic device 720 may transmit the receipt information to the first electronic device 101 to share the receipt information with the first electronic device 101. According to another embodiment, after all the payments are completed, the second electronic device 720 may transmit all the receipt information to the first electronic device 101 to share the receipt information for all the payments with the first electronic device 101.

According to various embodiments, in operation 736, a third electronic device 725 may perform payment. The user of the third electronic device 725 may perform payment at least once.

According to various embodiments, in operation 737, the third electronic device 720 may share the receipt information with the first electronic device 101. The third electronic device 725 may share the receipt information with the first electronic device 101 on the basis of the payment performed at least once. The third electronic device 725 may transmit the receipt information to the first electronic device 101 to share the receipt information with the first electronic device 101 on the basis of the payment performed at least once. According to an embodiment, whenever the payment is completed, the third electronic device 725 may transmit the receipt information to the first electronic device 101 to share the receipt information with the first electronic device 101. According to another embodiment, after all the payments are completed, the third electronic device 725 may transmit all the receipt information to the first electronic device 101 to share the receipt information for all the completed payment with the first electronic device 101.

According to various embodiments, in operation 738, the first electronic device 101 may transmit all the receipt information to the server 420. The first electronic device 101 may collect all the receipt information for the payment performed by the first electronic device 101, the second electronic device 720, and the third electronic device 725, and may transmit the collected receipt information to the server 420.

According to various embodiments, in operation 739, the server 420 (e.g., the server 108 of FIG. 1) may calculate the amount paid by each electronic device. The server 420 may calculate the total payment amount for all the payments performed by the first electronic device 101, the second electronic device 720, and the third electronic device 725, and may calculate the average amount. When at least one piece of receipt information is received from at least one electronic device, the server 420 (e.g., the server 108 of FIG. 1) may collect the received at least one piece of receipt information to calculate the payment amount for each user. For example, when the amount paid by the first user (e.g., the user of the first electronic device 101) is 10000 won, the amount paid by the second user (e.g., the user of the second electronic device 720) is 15000 won, and the amount paid by the third user (e.g., the user of the third electronic device 101) is 5000 won, the server 420 may calculate that the total payment amount is 30000 and the average payment amount is 10000 won.

According to various embodiments, in operation 740, the server 420 (e.g., the server 108 of FIG. 1) may transmit the calculated payment amount to the first electronic device 101. The server 420 may calculate that the total amount paid by the first to third users is 30000 won and the average amount is 10000 won, and then may notify the first electronic device 101 of the calculation result.

According to various embodiments, in operation 741, the server 420 (e.g., the server 108 of FIG. 1) may transmit the calculated payment amount to the second electronic device 101. The server 420 may calculate that the total amount paid by the first to third users is 30000 won and the average amount is 10000 won, and then may notify the second electronic device 720 of the calculation result. The server 420 may transmit a message indicating that the average payment amount is 10000 won and 5000 won can be received from the third user, to the electronic device 720 of the second user.

According to various embodiments, in operation 742, the server 420 (e.g., the server 108 of FIG. 1) may transmit the calculated payment amount to the third electronic device 101. The server 420 may calculate that the total amount paid by the first to third users is 30000 won and the average amount is 10000 won, and then may notify the third electronic device 725 of the calculation result. The server 420 may transmit, to the electronic device 725 of the third user, a request to transmit the amount of 5000 won obtained by deducting 5000 won paid by the third user from 10000 won which is the average payment amount to the second user.

Figure 7C:
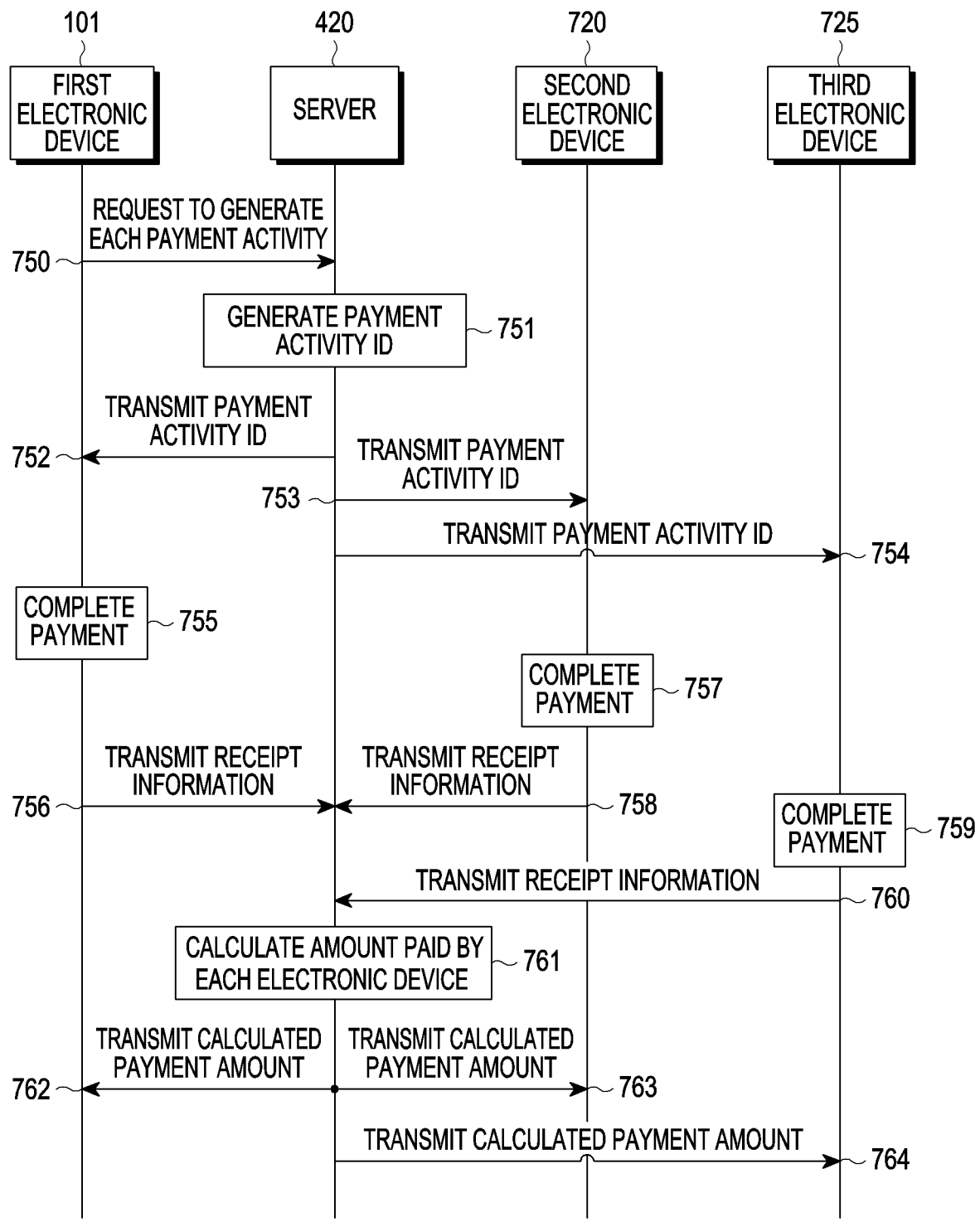
FIG. 7C is an exemplary diagram illustrating an operation in a system for collecting payment amounts made by a plurality of electronic devices and transmitting the payments to each of the electronic devices according to another embodiment.

FIG. 7C is an exemplary diagram illustrating an operation in a system for collecting payment amounts made by a plurality of electronic devices and transmitting the payments to each of the electronic devices according to another embodiment.

Hereinafter, an operation in a system for collecting payment amounts of a plurality of electronic devices and transmitting the payment amounts to each electronic device according to another embodiment will be described in detail with reference to FIG. 7C as follows.

According to various embodiments, in operation 750, the first electronic device 101 (e.g., the electronic device 101 of FIG. 1) may request to generate each payment activity from the server 420 (e.g., the server 108 of FIG. 1). The first electronic device 101 may request a payment activity identifier (ID) for extracting costs used by a plurality of users from the first external server 420. The request for the payment activity identifier may include an identifier of the first electronic device 101, an identifier of the second electronic device 720, and an identifier of the third electronic device 725. The payment activity identifier may be used to collect the total amount paid by the plurality of users, and to calculate the balance to be paid by each user from the collected total amount.

According to various embodiments, in operation 751, the server 420 (e.g., the server 108 of FIG. 1) may generate a payment activity identifier. The server 420 may generate the payment activity identifier on the basis of the request for generating the payment activity received from the first electronic device 101.

According to various embodiments, in operation 752, the server 420 (e.g., the server 108 of FIG. 1) may transmit the payment activity identifier to the first electronic device 101. The server 420 may transmit the generated payment activity identifier to the first electronic device 101.

According to various embodiments, in operation 753, the server 420 (e.g., the server 108 of FIG. 1) may transmit the payment activity identifier to the second electronic device 720. The server 420 may transmit the generated payment activity identifier to the second electronic device 720.

According to various embodiments, in operation 754, the server 420 (e.g., the server 108 of FIG. 1) may transmit the payment activity identifier to the third electronic device 101. The server 420 may transmit the generated payment activity identifier to the third electronic device 725.

According to various embodiments, in operation 755, the first electronic device 101 may perform payment. The user of the first electronic device 101 may perform payment at least once. The first electronic device 101 may store receipt information in the memory 130 on the basis of the payment performed at least once.

According to various embodiments, in operation 756, the first electronic device 101 may transmit the receipt information to the server 420. The first electronic device 101 may transmit the receipt information to the server 420 on the basis of the payment performed at least once. The first electronic device 101 may transmit the receipt information to the server 420 to share the receipt information with the user of the second electronic device 720 and the user of the third electronic device 725 on the basis of the payment performed at least once. According to an embodiment, whenever the payment is completed, the first electronic device 101 may transmit the receipt information to the server 420. According to another embodiment, after all the payments are completed, the first electronic device 101 may transmit the receipt information for the completed payments to the server 420.

According to various embodiments, in operation 757, the second electronic device 720 may perform payment. The user of the second electronic device 720 may perform payment at least once. The second electronic device 720 may store the receipt information in the memory on the basis of the payment performed at least once.

According to various embodiments, in operation 758, the second electronic device 720 may transmit the receipt information to the server 420. The second electronic device 720 may transmit the receipt information to the server 420 on the basis of the payment performed at least once. The second electronic device 720 may transmit the receipt information to the server 420 to share the receipt information with the user of the first electronic device 101 and the user of the third electronic device 725 on the basis of the payment performed at least once. According to an embodiment, whenever the payment is completed, the second electronic device 720 may transmit the receipt information to the server 420.

According to various embodiments, in operation 759, the third electronic device 725 may perform payment. The user of the third electronic device 725 may perform payment at least once. The third electronic device 725 may store the receipt information in the memory based on the payment performed at least once.

According to various embodiments, in operation 760, the third electronic device 725 may transmit the receipt information to the server 420. The third electronic device 725 may transmit the receipt information to the server 420 on the basis of the payment performed at least once. The third electronic device 725 may transmit the receipt information to the server 420 to share the receipt information with the user of the second electronic device 720 and the user of the third electronic device 725 on the basis of the payment performed at least once. According to an embodiment, whenever the payment is completed, the third electronic device 725 may transmit the receipt information to the server 420.

According to various embodiments, operations 761 to 764 may be the same as operations 739 to 742 of FIG. 7B.

Figure 7D:
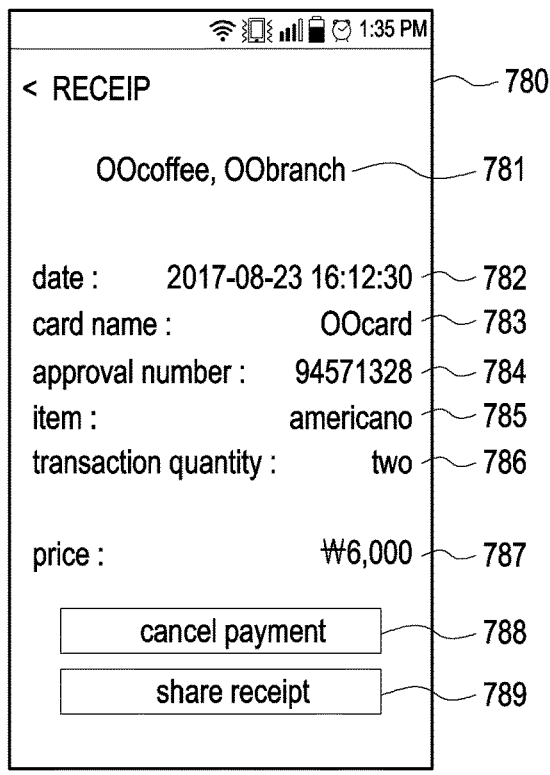
FIG. 7D is an exemplary diagram illustrating a user interface for sharing receipt information with at least one recipient in an electronic device according to various embodiments.

FIG. 7D is an exemplary diagram illustrating a user interface for sharing receipt information with at least one recipient in an electronic device according to various embodiments.

Referring to FIG. 7D, the need to transmit or share receipt information may be raised, such as in the case of sharing payment contents in order to handle expenses in a club or the like. In this case, the electronic device 101 (e.g., the processor of FIG. 1) may receive a request to share a receipt from a user through a user interface 780 including the receipt information. The user interface 780 may include a transaction store 781, a transaction date 782, a card name 783, an approval number 784, a transaction item 785, a transaction quantity 786, a transaction identifier, cancel payment 788, or share receipt (or receipt transmission) 789. The user interface 780 may include a code based on at least some of at least one of the transaction store 781, the transaction date 782, the card name 783, the approval number 784, the transaction item 785, the transaction quantity 786, or the transaction identifier. The code may include a barcode or QR code.

Figure 7E:
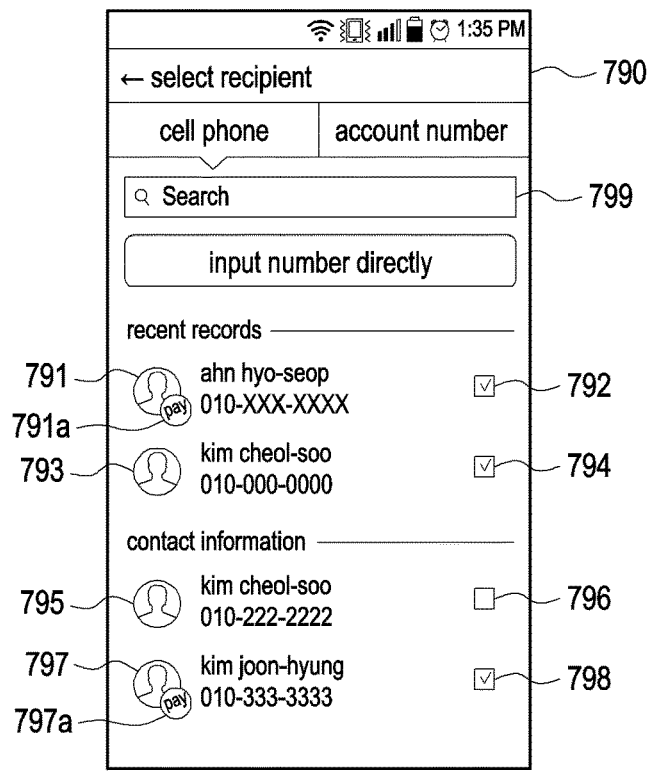
FIG. 7E is an exemplary diagram illustrating a user interface that displays at least one recipient list for sharing receipt information in an electronic device according to various embodiments.

FIG. 7E is an exemplary diagram illustrating a user interface that displays at least one recipient list for sharing receipt information in an electronic device according to various embodiments.

Referring to FIG. 7E, when an input for sharing receipt information with at least one recipient is received through the user interface 780, a user list 790 may be displayed through the display device 160 (e.g., a touch screen display). The electronic device 101 may display a plurality of pre-stored users through the display device 160 (e.g., a touch screen display). When the input for sharing the receipt information with the at least one recipient is received while a transaction result according to product purchase is displayed on the user interface, the user list 790 capable of selecting at least one user may be displayed through the display device 160 (e.g., a touchscreen display). At least one user (e.g., Ahn Hyo-seop, Gong Ji-cheol, or Kim Joon-hyung) to share with may be selected from the displayed user list. Alternatively, the electronic device 101 (e.g., the processor 120 of FIG. 1) may receive a user's contact information, email address, etc., for receiving the receipt information through an input window 799 of the user interface 790. The user interface 790 may display, to each user, icons 791a and 797a indicating whether a payment means (e.g., Samsung Pay) is used by each user. The user interface may display check boxes 792, 794, 796, and 798 capable of selecting each user. When an input for transmitting the receipt information is received through share receipt 789 of the user interface 790, the electronic device 101 (e.g., the processor 120 of FIG. 1) may extract payment details. The electronic device 101 (e.g., the processor 120 of FIG. 1) may transmit the extracted payment details to each user on the basis of a transmission method (e.g., SMS, MMS, or email) corresponding to the selected at least one user (e.g., Ahn Hyo-seop, Gong Ji-cheol, or Kim Joon-hyung).

Figure 8A:
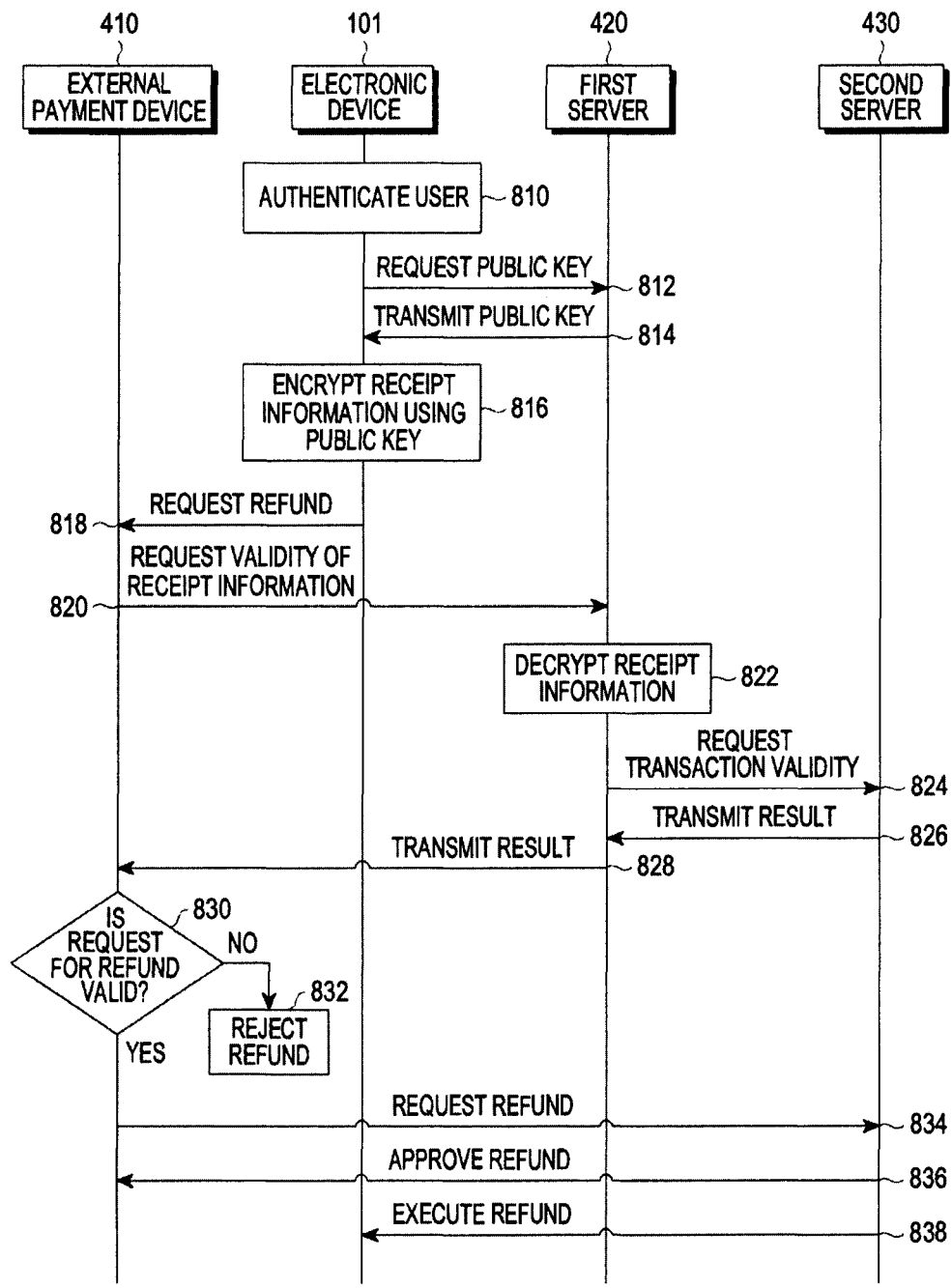
FIG. 8A is an exemplary diagram illustrating an operation in a system for refunding payment performed by an electronic device according to various embodiments.
Figure 8B:
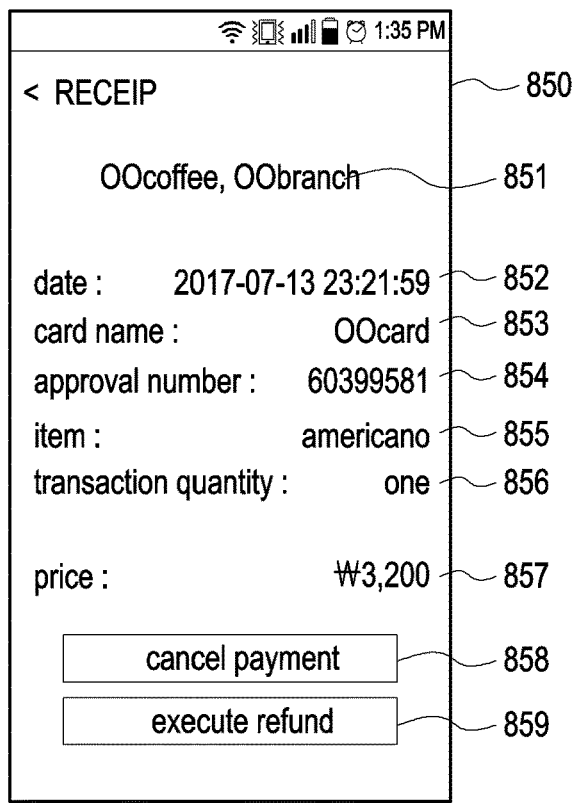
FIG. 8B is an exemplary diagram illustrating a user interface for refunding payment performed by an electronic device according to various embodiments.
Figure 8C:
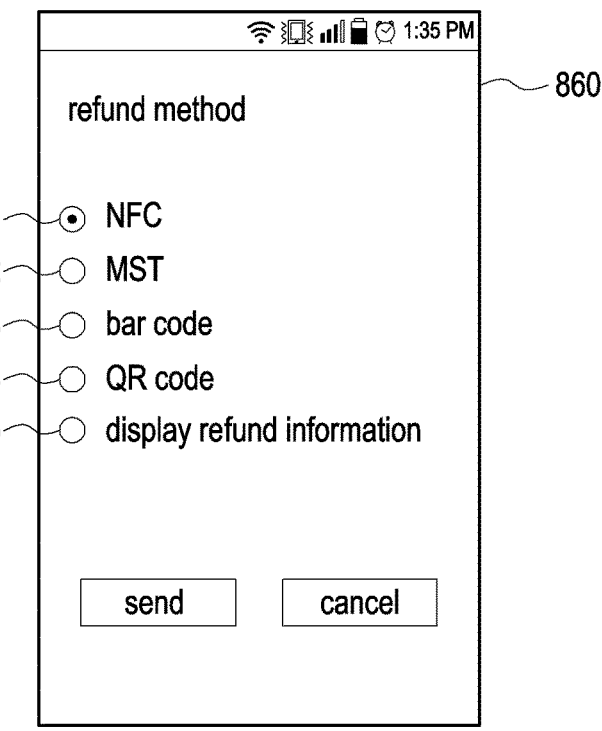
FIG. 8C is an exemplary diagram illustrating a refund method provided by an external payment device according to various embodiments.

FIG. 8A is an exemplary diagram illustrating an operation in a system for refunding payment performed by an electronic device according to various embodiments, FIG. 8B is an exemplary diagram illustrating a user interface for refunding payment performed by an electronic device according to various embodiments, and FIG. 8C is an exemplary diagram illustrating a refund method provided by an external payment device according to various embodiments.

Hereinafter, an operation in a system for refunding payment performed by an electronic device will be described in detail with reference to FIGS. 8A to 8C as follows.

According to various embodiments, in operation 810, the electronic device 101 (e.g., the processor 120 of FIG. 1) may perform user authentication. When a user makes a payment through a payment means (e.g., Samsung Pay), the user can be authenticated.

According to various embodiments, in operation 812, the electronic device 101 (e.g., the processor 120 of FIG. 1) may request a public key from the first server 420. The electronic device 101 may request the public key necessary to encrypt receipt information in the course of payment, from the first server 420. When a request for a refund is received, the electronic device 101 may request the public key from the first external server 420 through the second wireless communication circuit (e.g., cellular wireless communication circuit). When execute refund 859 in the user interface 850 is selected, the electronic device 101 may request the public key from the first external server 420 through the second wireless communication circuit (e.g., cellular wireless communication circuit). According to an embodiment, the electronic device 101 may periodically (e.g., within the validity period of the public key or the like) request the public key from the first server 420.

According to various embodiments, in operation 814, the first server 420 (e.g., the server 108 in FIG. 1) may transmit the public key to the electronic device 101 (e.g., the processor 120 in FIG. 1). The first server 420 may transmit the public key to the electronic device 101 in response to the request. The first server 420 may transmit the public key that can be shared during pairing between a private key and the public key to the electronic device 101. The public key may be necessary to perform authentication of a receipt for payment. In response to the request, the electronic device 101 (e.g., the processor 120 of FIG. 1) may receive the public key through the second wireless communication circuit (e.g., cellular wireless communication circuit).

According to various embodiments, in operation 816, the electronic device 101 (e.g., the processor 120 of FIG. 1) may encrypt the receipt information by using the public key. The electronic device 101 may extract at least one piece of receipt information necessary for a refund, and may encrypt the extracted receipt information by using the public key. When execute refund 859 of the user interface 850 is input, the electronic device 101 (e.g., the processor 120 of FIG. 1) may extract the receipt information including at least one of a transaction store 851, a transaction date 852, a card name 853, a transaction item 855, an approval number 854, a transaction quantity 856, or a transaction identifier, and may encrypt the extracted receipt information through the public key.

According to various embodiments, in operation 818, the electronic device 101 (e.g., the processor 120 of FIG. 1) may request a refund from the external payment device 410. The electronic device 101 may transmit an encrypted file or URL to an application or plug-in of the external payment device 410. The external payment device 410 may receive the request for the refund from the electronic device 101. In order to transmit the request for the refund to the external payment device 410, the electronic device 101 may identify a method of receiving refund data supported by the external payment device 410 of the corresponding store on the basis of the receipt information. When the request for the refund is input from the user, the electronic device 101 (e.g., the processor 120 of FIG. 1) may display at least one refund method provided by the external payment device 410 through the user interface 860 on the basis of the paid receipt. The interface 860 may include at least one of the refund methods provided by the external payment device 410, for example, an NFC 861, an MST 862, a bar code 863, a QR code 864, or refund information display 865. The interface 860 may display various refund methods in addition to the NFC 861, the MST 862, the bar code 863, the QR code 864, and the refund information display 865. For example, when one refund data reception method supported by the external payment device 410 is provided, the electronic device 101 (e.g., the processor 120 of FIG. 1) may prepare for refund transmission by using the corresponding reception method. By way of another example, when a plurality of refund data reception methods supported by the external payment device 410 is provided, the electronic device 101 (e.g., the processor 120 of FIG. 1) may transmit the request for the refund to the external electronic device 410 on the basis of the refund method using one (e.g., the NFC 861) selected by the user among the various refund methods. The electronic device 101 may transmit the request for the refund to the external payment device 410 through the wireless communication circuit (e.g., near-distance wireless communication circuit) on the basis of the selected refund method.

According to various embodiments, in operation 820, the external payment device 410 may request validity of the receipt information from the first server 420. The external payment device 410 may request information indicating whether the transaction for the refund is valid from the first server 420. The application or plug-in of the external payment device 410 may transmit the encrypted file to the first server 420. The external payment device 410 may transmit the encrypted receipt information to the first server 420 to request the information indicating whether the transaction for the refund is valid.

According to various embodiments, in operation 822, the first server 420 may decrypt the receipt information. The first server 420 may decrypt the encrypted receipt information on the basis of the public key provided to the electronic device 101. The first server 420 may determine whether the transaction for the refund is valid by decrypting the received receipt information. The first server 420 may determine whether the transaction for the refund is valid on the basis of at least one of a transaction store 851, a transaction date 852, a card name 853, a transaction item 855, an approval number 854, a transaction quantity 856, or a transaction identifier.

According to various embodiments, in operation 824, the first server 420 may request transaction validity from the second server 430. The first server 420 may transmit the decrypted receipt information to the second server 430 to request transaction validity. The first server 420 may request information indicating whether the transaction for the refund is valid from the second server 430 on the basis of the at least one of the transaction store 851, the transaction date 852, the card name 853, the transaction item 855, the approval number 854, the transaction quantity 856, or the transaction identifier.

According to various embodiments, in operation 826, the second server 430 may transmit a result of the transaction validity to the first server 420. The second server 430 may determine whether the transaction for the refund is valid on the basis of the at least one of the transaction store 851, the transaction date 852, the card name 853, the transaction item 855, the approval number 854, the transaction quantity 856, or the transaction identifier, and may transmit the result of the transaction validity to the first server 420.

According to various embodiments, in operation 828, the first server 420 may transmit the result of the transaction validity to the external payment device 410. The first server 420 may transmit the result of the transaction validity received from the second server 430 to the external payment device 410. The external payment device 410 may receive the result of the transaction validity from the first server 420.

According to various embodiments, in operation 830, the external payment device 410 may determine whether a request for a refund is valid. The external payment device 410 may determine whether the request for the refund is valid on the basis of the result of the transaction validity received from the electronic device 101.

According to various embodiments, in operation 832, when the request for the refund is not valid, the external payment device 410 may reject the refund. When the request for the refund is not valid, the external payment device 410 may output a message indicating that the request for the refund is not valid through the display unit (not shown) of the external payment device 410 to allow a user to know of the rejection of the refund.

According to various embodiments, in operation 834, the external payment device 410 may request the refund from the second server 430. When the request for the refund is valid, the external payment device 410 may request the refund from the second server 430. When the request for the refund is valid, the external payment device 410 may request the refund from the second server 430 so that the approval of the pre-paid amount is canceled. According to an embodiment, the external payment device 410 may request the refund from the first server 420, and the first server 420 may transmit the request for the refund received from the external payment device 410 to the second server 430.

According to various embodiments, in operation 836, the second server 430 may transmit information indicating that the refund is approved to the external payment device 410. The second server 430 may transmit information indicating that the approval of the paid amount has been canceled on the basis of the request for the refund received from the external payment device 410, to the external payment device 410.

According to various embodiments, in operation 838, the second server 430 may notify the electronic device 101 of information indicating that the refund has been approved. The second server 430 may transmit, to the electronic device 101, information indicating that the approval for the paid amount has been canceled.

Figure 9A:
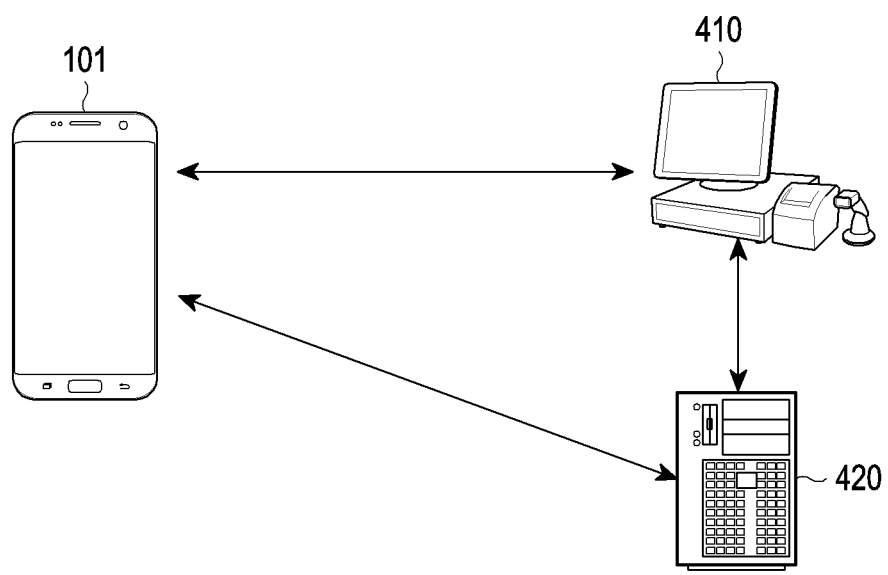
FIG. 9A is an exemplary diagram illustrating a system that performs authentication for a refund requested by an electronic device according to various embodiments.
Figure 9B:
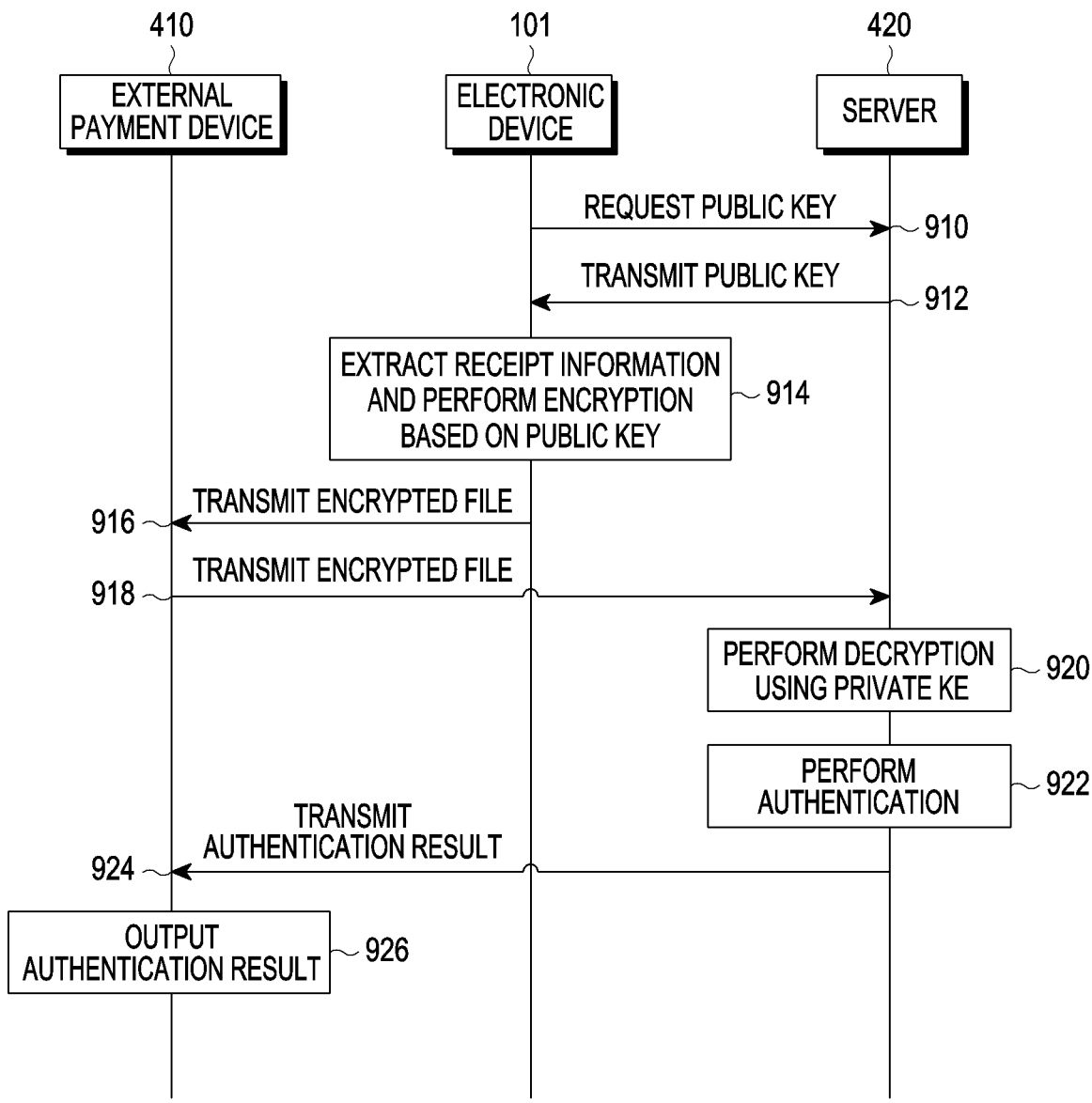
FIG. 9B is an exemplary diagram illustrating an operation in a system that performs authentication for a refund requested by an electronic device according to various embodiments.

FIG. 9A is an exemplary diagram illustrating a system that performs authentication for a refund requested by an electronic device according to various embodiments, and FIG. 9B is an exemplary diagram illustrating an operation in a system that performs authentication for a refund requested by an electronic device according to various embodiments.

Hereinafter, an operation in a system for authenticating a refund requested by the electronic device will be described in detail with reference to FIGS. 9A and 9B as follows.

According to various embodiments, the electronic device 101 (e.g., the processor 120 of FIG. 1) may perform a transaction with the external payment device 410. The electronic device 101 may perform the transaction with the external payment device 410 through a first wireless communication circuit (e.g., near-distance wireless communication circuit), and may receive a transaction result from the server 420 through a second wireless communication circuit (e.g., cellular wireless communication circuit). The electronic device 101 (e.g., the processor 120 of FIG. 1) may receive the transaction result including the receipt information from the server 420 through the second wireless communication circuit (e.g., cellular wireless communication circuit) by using an application (e.g., payment service client application). The electronic device 101 may transmit a request for a refund to the external payment device 410.

According to various embodiments, the server 420 (e.g., the server 108 of FIG. 1) may manage the receipt information on the basis of a payment means. For example, the server 420 is a server that manages the receipt information by various payment means (e.g., Samsung Pay) used for payment, and may include a server of a company that provides the payment means. When the payment is performed, the server 420 may check the receipt according to product purchase. The server 420 may store transaction details and the receipt information, and may process receipt authentication. When a request is received from the external payment device 410, the server 420 may perform authentication on a receipt by using a public key, and when the receipt is authenticated, the server 420 may request a validity check from the second external server 430.

According to various embodiments, in operation 910, the electronic device 101 (e.g., the processor 120 of FIG. 1) may request the public key from the server 420. The electronic device 101 may request the public key required to encrypt the receipt information in the course of payment from the server 420. When the request for the refund is received from the user, the electronic device 101 may request the public key from the external server 420 through the wireless communication circuit (e.g., cellular wireless communication circuit). When execute refund in the user interface is selected, the electronic device 101 may request the public key from the external server 420 through the wireless communication circuit (e.g., cellular wireless communication circuit). According to an embodiment, the electronic device 101 may periodically request the public key from the server 420 (e.g., within the validity period of the public key).

According to various embodiments, in operation 912, the server 420 (e.g., the server 108 of FIG. 1) may transmit the public key to the electronic device 101. The server 420 may transmit the public key to the electronic device 101. The server 420 may transmit the public key that can be shared during pairing between a private key and the public key to the electronic device 101. The public key may be necessary to encrypt the receipt information or perform authentication of the receipt for payment. In response to the request, the electronic device 101 may receive the public key through the wireless communication circuit (e.g., cellular wireless communication circuit). According to an embodiment, the server 420 may periodically transmit the public key to the electronic device 101 (e.g., within the validity period of the public key, etc.).

According to various embodiments, in operation 914, the electronic device 101 (e.g., the processor 120 of FIG. 1) may extract the receipt information and may encrypt the receipt information based on the public key. The electronic device 101 may encrypt the receipt information using the public key. The electronic device 101 may extract at least one piece of receipt information necessary for the refund, and may encrypt the extracted receipt information using the public key. When execute refund of the user interface is input, the electronic device 101 (e.g., the processor 120 of FIG. 1) may extract the receipt information including at least one of a transaction store, a transaction date, a card name, a transaction item, an approval number, a transaction quantity, or a transaction identifier, and may encrypt the extracted receipt information through the public key.

According to various embodiments, in operation 916, the electronic device 101 (e.g., the processor 120 of FIG. 1) may transmit an encrypted file to the external payment device 410. The electronic device 101 may transmit the encrypted file to the external payment device 410 through the wireless communication circuit (e.g., near-distance wireless communication circuit). The electronic device 101 (e.g., the processor 120 of FIG. 1) may transmit the encrypted file or a URL to an application or plug-in of the external payment device 410.

According to various embodiments, in operation 918, the external payment device 410 may transmit the received encrypted file to the server 420. The external payment device 410 may transmit the received encrypted file to the server 420 to request authentication. The external payment device 410 may transmit the encrypted receipt information received from the electronic device 101 to the server 420 through the wireless communication circuit (e.g., cellular wireless communication circuit) to authenticate the receipt according to the request for the refund.

According to various embodiments, in operation 920, the server 420 (e.g., the server 108 of FIG. 1) may decrypt the encrypted file using the public key transmitted to the electronic device 101. The server 420 may decrypt the encrypted receipt information on the basis of the public key provided to the electronic device 101. The server 420 may decrypt the received receipt information to determine whether the transaction for the refund is valid.

According to various embodiments, in operation 922, the server 420 (e.g., the server 108 of FIG. 1) may perform authentication using the decrypted file. The server 420 may authenticate the decrypted receipt information. The server 420 may determine whether the transaction for the refund is valid by decrypting the received receipt information. The server 420 may determine whether the transaction for the refund is valid on the basis of at least one of a transaction store, a transaction date, a card name, a transaction item, an approval number, a transaction quantity, or a transaction identifier included in the receipt information.

According to various embodiments, in operation 924, the server 420 (e.g., the server 108 of FIG. 1) may transmit an authentication result to the external payment device 410. The server 420 may transmit a result obtained by performing authentication to the external payment device 410. The result may include information on whether authentication has been successfully performed or information indicating that authentication has failed.

According to various embodiments, in operation 926, the external payment device 410 may output the authentication result. The external payment device 410 may analyze the received authentication result to determine whether authentication of the receipt information is approved. According to an embodiment, when the authentication of the receipt information is approved, the external payment device 410 may output a message indicating that the authentication is approved through the display unit (not shown) of the external payment device 410, thereby allowing the user of the electronic device 101 to know that the authentication for the receipt information has been approved. Through this, the user may know that the refund has been completed. According to an embodiment, when the authentication of the receipt information is not approved, the external payment device 410 may output a message indicating that the authentication is not approved through the display unit (not shown) of the external payment device 410, thereby allowing the user of the electronic device 101 to know that the authentication for the receipt information has not been approved. Through this, the user may know that the refund has been rejected.

What is claimed is:

1. An electronic device comprising:
   a communication module;
   a display module;
   a memory; and
   a processor configured to be operatively connected to the communication module, the display module and the memory; and
   wherein the memory stores instructions which, when executed, cause the processor to:
   perform a transaction with an external payment device through the communication module by using an application program for a payment;
   receive a transaction result including receipt information from a first external server through the communication module by using the application program;
   in response to receiving a request for a refund using a user interface of the application program displayed on the display module, encrypt the receipt information using a public key received from the first external server, generate a file for refund based on the encrypted receipt information, and control the communication module to transmit the file to the external payment device by using the application program; and
   receive, from a second external server through the communication module by using the application program, information on the refund obtained according to a validity determination of the file by the second external server,
   wherein the validity determination of the file is determined by the second server when the external payment device requests the validity determination of the file to the second server via the first server,
   wherein the file is decrypted using the public key by the first server, and
   wherein the receipt information includes a transaction item and at least one of a transaction store, a transaction date, an approval number, a transaction quantity, or a transaction identifier (ID).

2. The electronic device of claim 1, wherein the communication module includes a first wireless communication circuit in communication with the external payment device and a second wireless communication circuit in communication with the first external server, and
   wherein the first wireless communication circuit is configured with a magnetic secure transmission (MST) and/or near field communication (NFC).

3. The electronic device of claim 1, wherein the file includes information of a uniform resource locator (URL) related to the encrypted receipt information.

4. The electronic device of claim 1, wherein the processor is configured to control the display module to display, on the user interface, the transaction result including the receipt information and a code,
   wherein the code is a bar code or a quick response (QR) code and is set based on the at least one of the transaction store, the transaction date, the approval number, the transaction item, the transaction quantity, or the transaction ID.

5. The electronic device of claim 1, wherein the processor is configured to receive, from the first external server via the second external server, result information obtained by checking an authentication and the validity of the file for the refund.

6. The electronic device of claim 4, wherein the processor is configured to control the display module to display at least one of a user interface object related to the refund and the object for sending the receipt information or an object or sharing of the receipt information on the user interface.

7. The electronic device of claim 1, wherein the processor is configured to:
   identify a type of the external payment device based on the received transaction result in order to transmit the request for the refund; and
   transmit the file for the refund to the external payment device based on the identified type.

8. The electronic device of claim 1, wherein the processor is configured to:
   extract payment details including in the receipt information when a user selection for transmitting or sharing the receipt information is received;
   generate the file including the extracted payment details; and
   wherein the payment details include the transaction item and at least one of the transaction store, the transaction date, the approval number, the transaction quantity, or the transaction identifier (ID).

9. The electronic device of claim 8, wherein the processor is configured to:
   control the display module to display a list of recipients for selecting at least one external electronic device to transmit request information.

10. The electronic device of claim 9, wherein the processor is configured to:
    collect, when at least one piece of receipt information is received from the at least one electronic device, the received at least one piece of receipt information to calculate a payment amount for each user of the at least one electronic device; and
    control the communication module to transmit information on the calculated payment amount to the at least one electronic device.

11. The electronic device of claim 9, wherein the instructions include instructions that cause the processor to:
- collect, when at least one piece of receipt information is received from the at least one external electronic device, the received at least one piece of receipt information;
- control the communication module to transmit the collected at least one piece of receipt information to the first external server; and
- receive, from the first external server via the communication module, information on a calculated payment amount by the first external server based on of the collected at least one piece of receipt information.

12. An electronic device comprising:
- a communication module;
- a display module;
- a memory; and
- a processor configured to be operatively connected to the communication module, the display module and the memory;
- wherein the memory stores instructions which, when executed, cause the processor to:
- perform a transaction with an external payment device through the communication module by using an application program for a payment;
- receive a transaction result including receipt information from a first external server through the communication module by using the application program;
- after the transaction result is received, control the display module to display the receipt information and object related to sharing or sending of the receipt information on a user interface of the application program;
- in response to a request for sharing or sending of the receipt information, encrypt the receipt information using a public key received from the first external server, generate a file for refund based on encrypted receipt information, and control the communication module to transmit the file to at least one external electronic device by using the application program; and
- in response to receiving a request for a refund, receive, from a second external server through the communication module by using the application program, information on the refund obtained according to a validity determination of the file by the second external server,
- wherein the validity determination of the file is determined by the second server when the external payment device requests the validity determination of the file to the second server via the first server,
- wherein the file is decrypted using the public key by the first server, and
- wherein the receipt information includes a transaction item and at least one of a transaction store, a transaction date, an approval number, a transaction quantity, or a transaction identifier (ID).

13. A computer-readable storage medium that stores a program including instructions for performing payment in an electronic device, comprising:
- performing a transaction with an external payment device through a communication module by using an application program for a payment;
- receiving a transaction result including receipt information from a first external server through the communication module by using the application program;
- in response to receiving a request for a refund using a user interface of the application program displayed on a display module, encrypting the receipt information using a public key received from the first external server, generating a file for refund based on the encrypted receipt information, and controlling the communication module to transmit the file to the external payment device by using the application program; and
- receiving from a second external server through the communication module by using the application program, information on the refund obtained according to a validity determination of the file by the second external server,
- wherein the validity determination of the file is determined by the second server when the external payment device requests the validity determination of the file to the second server via the first server,
- wherein the file is decrypted using the public key by the first server, and
- wherein the receipt information includes a transaction item and at least one of a transaction store, a transaction date, an approval number, a transaction quantity, or a transaction identifier (ID).

* * * * *